US010420104B2

(12) United States Patent
Stauffer et al.

(10) Patent No.: US 10,420,104 B2
(45) Date of Patent: Sep. 17, 2019

(54) CARRIER AGGREGATION ON COMBINED USER EQUIPMENT

(71) Applicant: Google Inc., Mountain View, CA (US)

(72) Inventors: Erik Stauffer, Sunnyvale, CA (US); Paul Heninwolf, San Carlos, CA (US)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 15/385,350

(22) Filed: Dec. 20, 2016

(65) Prior Publication Data

US 2018/0176917 A1   Jun. 21, 2018

(51) Int. Cl.
*H04W 72/04* (2009.01)

(52) U.S. Cl.
CPC ...... *H04W 72/0453* (2013.01); *H04W 72/048* (2013.01)

(58) Field of Classification Search
None
See application file for complete search history.

(56) References Cited

U.S. PATENT DOCUMENTS

| 9,125,197 | B2* | 9/2015 | Liao | H04W 36/08 |
| 2010/0322175 | A1 | 12/2010 | Chen | |
| 2011/0081913 | A1* | 4/2011 | Lee | H04L 5/003 |
| | | | | 455/450 |
| 2013/0250881 | A1* | 9/2013 | Liao | H04W 36/08 |
| | | | | 370/329 |
| 2015/0245219 | A1 | 8/2015 | Wei | |
| 2016/0021625 | A1* | 1/2016 | Li | H04W 72/1289 |
| | | | | 370/336 |
| 2016/0050652 | A1* | 2/2016 | Wu | H04L 5/001 |
| | | | | 370/329 |
| 2017/0041919 | A1* | 2/2017 | Tanaka | H04W 76/14 |
| 2017/0202001 | A1* | 7/2017 | Guo | H04W 84/10 |
| 2017/0215175 | A1* | 7/2017 | Kim | H04W 72/042 |
| 2018/0176917 | A1* | 6/2018 | Stauffer | H04W 72/0453 |

FOREIGN PATENT DOCUMENTS

| WO | 2014145102 A1 | 9/2014 |
| WO | 2016022214 A1 | 2/2016 |

OTHER PUBLICATIONS

International Search Report and Written Opinion for the related application No. PCT/US2017/053968 dated Jan. 19, 2018.

* cited by examiner

*Primary Examiner* — Huy D Vu
*Assistant Examiner* — Bao G Nguyen
(74) *Attorney, Agent, or Firm* — Honigman LLP

(57) ABSTRACT

A method includes receiving a connection request from a network base station on a primary component carrier (CC) associated with a primary user equipment (UE), and connecting to the network base station on the primary CC. The method also includes receiving a configuration message from the network base station. The configuration message instructs operation of at least one secondary CC. The at least one secondary CC is associated with at least one secondary UE. The method also includes, in response to receiving the configuration message, instructing the at least one secondary UE to operate on the at least one secondary CC and receive data from the network base station on the at least one secondary CC.

28 Claims, 16 Drawing Sheets

CARRIER AGGREGATION ON COMBINED USER EQUIPMENT

TECHNICAL FIELD

This disclosure relates to carrier aggregation on a combination of user equipment.

BACKGROUND

Long-Term Evolution (LTE) is a standard for wireless communication of high-speed data for mobile phones and data terminals. LTE is based on a Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different ratio interfaces in addition to core network improvements. LTE supports scalable carrier bandwidths, from 1.4 MHz to 20 MHz and supports both frequency division duplexing (FDD) and time-division duplexing (TDD).

In LTE networks, a wireless User Equipment (UE) can be allocated a traffic channel and a signaling channel by an evolved Node B (eNB) for exchanging signaling and communications with the eNB. Carrier aggregation allows the eNB to allocate multiple carriers (e.g., mobile operators) jointly for use by the UE in exchanging higher rate communications with the eNB. Each aggregated carrier is referred to as a component carrier (CC). Carrier aggregation generally defines a number of servicing cells, one for each component carrier. The coverage of the serving cells may differ. For instance, a Primary Serving Cell (PSC) may serve a Primary CC (PCC) for handling Radio Resource Control (RRC) connection between the UE and the eNB, while at least one Secondary Servicing Cell (SCC) associated with at least one Secondary CC (SCC) may be added for providing additional bandwidth.

SUMMARY

One aspect of the disclosure provides a method for instructing at least one secondary UE to operate on at least one secondary CC and receive data from a network base station on the at least one secondary CC. The method includes receiving, at data processing hardware of a primary UE, a connection request from a network base station on a primary CC associated with the primary UE. The method also includes connecting, by the data processing hardware, to the network base station on the primary CC and receiving, at the data processing hardware, a configuration message from the network base station. The configuration message instructs operation of the at least one secondary CC, the at least one secondary CC associated with at least one secondary UE. In response to receiving the configuration message, the method includes instructing, by the data processing hardware, the at least one secondary UE to operate on the at least one secondary CC and receive data from the network base station on the at least one secondary CC.

Implementations of the disclosure may include one or more of the following optional features. In some implementations, in response to receiving the configuration message, the method includes instructing, by the data processing hardware, the at least one secondary UE operating on the at least one secondary CC to send the received data from the network base station to a target device. The target device may include at least one of another base station or another UE.

In some examples, the method includes advertising, by the data processing hardware, a carrier aggregation capability of a combined UE including the primary UE and the at least one secondary UE. The combined UE may be recognized by the network base station as a single UE associated with the primary CC and the at least one secondary CC. In response to advertising the carrier aggregation capability, the method may include receiving the connection request, the connection request for communicating on one of the primary CC or the at least one secondary CC. Instructing the at least one secondary CC to operate may include enabling a combined-UE operating state of the at least one secondary UE. The combined-UE operating state may allow cross-carrier aggregation of a combined UE including the primary UE and the at least one secondary UE. The combined UE may be recognized by the network base station as a single UE associated with the primary CC and the at least one secondary CC. The at least one secondary UE may include a plurality of secondary UEs, and the configuration message may instruct enabling a target secondary UE associated with a target secondary CC to receive the data from the network base station.

After enabling the combined-UE operating state of the target secondary UE, the method may include scheduling transmission of data from the network base station to the target secondary UE. The method may also include transmission of the data from the target secondary UE to a target device. In some examples, the at least one secondary CC may include a plurality of secondary CCs, and the configuration message may instruct enabling a target secondary UE to operate on a first target secondary CC to receive the data from the network base station and to operate on a second target secondary CC to receive data from another base station. The at least one secondary UE may include a plurality of secondary UEs and the at least one secondary CC may include a plurality of secondary CCs. The configuration message may further instruct enabling a first target secondary UE associated with a first target secondary CC to receive the data from the base station and may instruct enabling a second target secondary UE associated with a second target secondary CC to receive data from the network base station.

Another aspect of the disclosure provides a system for instructing at least one secondary UE to operate on at least one secondary CC and receive data from a network base station on the at least one secondary CC. The system includes a network base station and a plurality of UEs including a primary UE and secondary UEs. Each UE is associated with at least one CC. The primary UE is configured to perform operations. The operations include receiving a connection request from the network base station on a primary CC associated with the primary UE and connecting to the network base station on the primary CC. The operations also include receiving a configuration message from the network base station, the configuration message instructing operation of at least one secondary CC, the at least one secondary CC associated with at least one secondary UE. In response to receiving the configuration message, the operations include instructing the at least one secondary UE to operate on the at least one secondary CC and receive data from the network base station on the at least one secondary CC.

This aspect may include one or more of the following optional features. In some implementations, the operations include, in response to receiving the configuration message, instructing the at least one secondary UE operating on the at least one secondary CC to send the received data from the network base station to a target device. The target device may include at least one of another base station or another UE. The operations may also include advertising a carrier aggregation capability of a combined UE including the primary UE and the at least one secondary UE. The combined UE may recognize by the network base station as a single UE associated with the primary CC and the at least one secondary CC. In response to advertising the carrier aggregation capability, the operations may include receiving the connection request, the connection request for communicating on one of the primary CC or the at least one secondary CC.

In some examples, the operations include instructing the at least one secondary CC to operate including enabling a combined-UE operating state of the at least one secondary UE. The combined-UE operating state may allow cross-carrier aggregation of a combined UE including the primary UE and the at least one secondary UE, the combined UE recognized by the network base station as a single UE associated with the primary CC and the at least one secondary CC. The at least one secondary UE may include a plurality of secondary UEs, and the configuration message may instruct enabling a target secondary UE associated with a target secondary CC to receive the data from the network base station. After enabling the combined-UE operating state of the target secondary UE, the operations may include scheduling transmission of data from the network base station to the target secondary UE. The target secondary UE may transmit the data from the network base station to a target device.

The at least one secondary CC may include a plurality of secondary CCs. The configuration message may instruct enabling a target secondary UE to operate on a first target secondary CC to receive the data from the base station and to operate on a second target category CC to receive data from another base station. The at least one secondary UE may include a plurality of secondary UEs and the at least one secondary CC may include a plurality of secondary CCs. The configuration message may instruct enabling a first target secondary UE associated with a first target secondary CC to receive the data from the base station and instruct enabling a second target secondary UE associated with a second target secondary CC to receive data from the base station.

Yet another aspect of the disclosure provides a method for routing a communication of data from a network base station through a combined UE to the destination. The method includes receiving, at data processing hardware, a communication request from a network base station for delivery of data to a destination and routing, by the data processing hardware, the communication of data from the network base station through the combined UE to the destination. The combined UE may include slave UEs, each slave UE in communication with the data processing hardware and having an associated CC, the combined UE recognized by the network base station as a single UE associated with the CCs of the slave UEs. The routing includes identifying at least one target slave UE for routing the communication of data based on the CC associated with the at least one target slave UE and scheduling the routing of the communication of data through the identified at least one target slave UE.

This aspect may include one or more of the following optional features. In some implementations, the routing includes identifying multiple target slave UEs for routing the communication of data and scheduling concurrent routing of the communication of data through the identified multiple target slave UEs. The CC associated with each slave UE may be different from each other CC associated with each other slave UE. Each slave UE may include an associated network identity that is different from each other network identity associated with each other slave UE. The method may further include providing, by the data processing hardware, the network identity associated with each slave UE to the network base station.

Yet another aspect of the disclosure provides a system for routing a communication of data from a network base station through a combined UE to a destination. The system includes a network base station, the combined UE including slave UEs, and a network device in communication with the network base station and the slave UEs. Each slave UE has an associated CC. The combined UE may be recognized by the network base station as a single UE associated with the CCs of the slave UEs. The network base station may be configured to perform operations. The operations include receiving a communication request from the network base station for delivery of data to a destination and routing the communication of data from the network base station through the combined UE to the destination. The routing includes identifying at least one target slave UE for routing the communication of data based on the CC associated with the at least one target slave UE and scheduling the routing of the communication of data through the identified at least one target slave UE.

This aspect may include one or more of the following optional features. In some implementations, the routing includes identifying multiple target slave UEs for routing the communication of data and scheduling concurrent routing of the communication of data through the identified multiple target slave UEs. The CC associated with each slave UE may be different from each other CC associated with each other slave UE. Each slave UE may include an associated network identity that is different from each other network identity associated with each other slave UE. The system may also include providing, by the data processing hardware, the network identity associated with each slave UE to the network base station.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Fixed wireless network subscribers typically use mobile terminals (e.g., mobile phones) having high-volume and inexpensive mobile chipsets. These inexpensive mobile chipsets restrict the mobile phones to lower data rate plans peaking at 100 Megabits per second (Mbps). While wireless spectrum within bands ranging from about 80 Megahertz (MHz) to about 100 MHz may allow service providers to offer higher data rate plans (e.g., greater than 500 Mbps), the inexpensive mobile chipsets prevent the mobile terminals for achieving the high data rates. For instance, available network base stations may support up to five component carriers that may be aggregated to communicate data to and from mobile terminals within a service area of the network base station. However, due to legacy constraints and limiting power consumption, the mobile terminals currently only support one or two downlink component carriers, and are only expected to support up to three downlink component carriers in the following years. As a result, the mobile terminals are lagging behind the performance capabilities of the network base stations.

Implementations herein are directed toward combining multiple mobile terminals into a combined terminal that is recognized by network base stations as a single device. Here, the combined terminal leverages at least one component carrier from each of the multiple mobile terminals to provide carrier aggregation capabilities in line with the carrier aggregation capabilities of the network base stations. As each of the mobile terminals typically only supports the aggregation of two component carriers, the combined terminals allows five or more component carriers to be aggregated, and therefore improves a threshold efficiency of the wireless spectrum.

Figure 1:
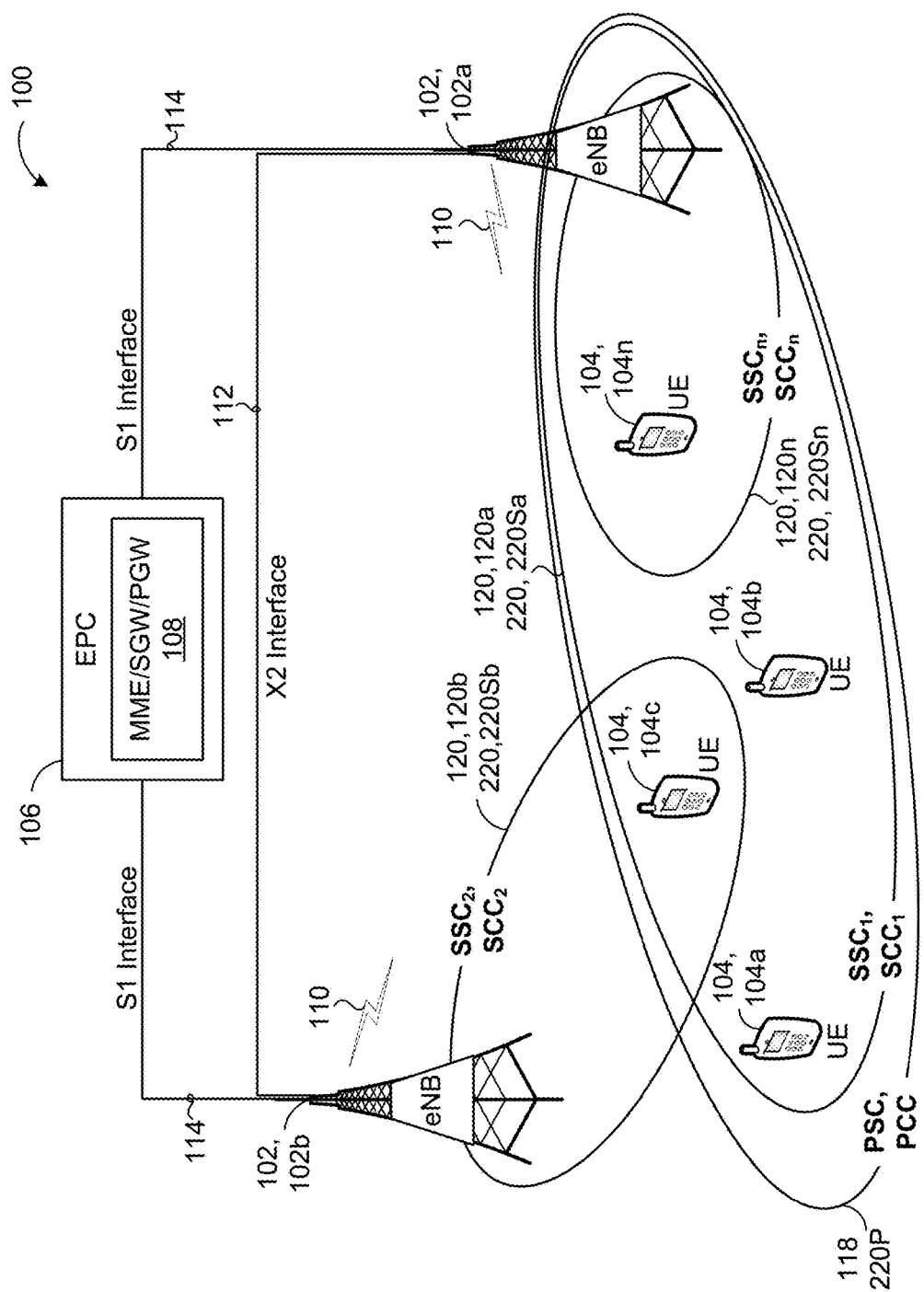
FIG. 1 is a schematic view of an example network.

FIG. 1 shows a Long-Term Evolution (LTE) network 100. LTE is a standard for wireless communication of high-speed data between multiple base stations 102, 102a-n and User Equipment (UE) 104, 104a-n, such as mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). LTE-TDD networks 100 use a single frequency for uploading and downloading information. LTE-TDD networks 100 operate at frequencies ranging from 1450 MHz to 4300 MHz, with several different bands being used. On the other hand, LTE-FDD networks 100 refer to the transmitting device (e.g., base station 102 and the UE 104 transmitting and/or receiving upon different carrier frequencies.

In some implementations, an Evolved Packet Core (EPC) 106 provides a framework configured to converge voice and data on the LTE network 100. The EPC 106 unifies voice and data on an Internet Protocol (IP) service architecture and voice is treated as just another IP application. The EPC 106 includes several key components 108 that include, without limitations, a Mobility Management Entity (MME), a Serving Gateway (SGW), and a Packet Data Node Gateway (PGW).

The MME is a key control-code for the LTE network 100. The MME manages session and states and authenticates and tracks a UE 104 across the network 100. The SGW is responsible for routing packets through the network 100. The PGW is an interface between the LTE network 100 and other packet data networks, manages quality of service (QoS), and provides deep packet inspection (DPI).

Each base station 102 may include an evolved Node B (also referred as eNode B or eNB). An eNB 102 includes hardware that connects to an air interface 110 (e.g., a mobile phone network) for communicating directly with the UEs 104. For instance, the eNB 102 may transmit downlink LTE signals (e.g., communications) to the UEs 104 and receive uplink LTE signals from the UEs 104 over the air interface 110. The eNB 102 does not have a separate controller element and, thus, simplifies the architecture of the network 100. In addition, the eNB 102 embeds its own control functionality, since the eNB 102 does not include a separate controller element. The eNB 102 uses multiple protocols when interfacing with different elements. For example, the eNB 102 uses an X2-interface 112 when communicating with other eNBs 102 in the network 100 and uses an S1 interface 114 for communicating with the EPC 106. The S1 interface 114 may include an S1-MME interface for communicating with the MME and an S1-U interface for interfacing with the SGW. Accordingly, the S1 interface 114 is associated with a backhaul link for communicating with the EPC 106.

UEs 104 may be any telecommunication device that is capable of transmitting and/or receiving voice/data over the network 100. UEs 104 may include, but are not limited to, mobile computing devices, such as laptops, tablets, smart phones, and wearable computing devices (e.g., headsets and/or watches). UEs 104 may also include other computing devices having other form factors, such as computing devices included in desktop computers, vehicles, gaming devices, televisions, or other appliances (e.g., networked home automation devices and home appliances).

In some examples, the network 100 supports carrier aggregation where multiple component carriers (CCs) 220 (FIGS. 2A and 2B) are aggregated and jointly used for transmission to/from a single device (e.g., UE 104). The network 100 may include an LTE-Advanced network under Release 10 (LTE Rel-10) providing higher bitrates while still fulfilling requirements set by existing 4G networks. Under LTE Rel-10, a CC 220 may have a bandwidth of 1.4, 3, 5, 10 or 20 Megahertz (MHz) and a maximum of five CCs 220 may be aggregated to provide a maximum aggregated bandwidth equal to 100 MHz. Future releases, such as LTE Release 13 (LTE Rel-13), may support up to a maximum of thirty-two (32) CCs 220. In FDD-networks 100, the number of aggregated carriers may be different for downlink (DL) communications and uplink (UL) communications. However, the number of UL CCs 220 is always equal to or less than the number of DL CCs 220 and individual CCs 220 can also be of different bandwidths. In TDD-networks 100, the number of CCs 220 as well as the bandwidths of each CC 220 are normally the same for DL and UL communications.

The easiest way to arrange aggregation is through contiguous CCs with the same frequency band, referred to as intra-band contiguous carrier aggregation. However, due to multiple different operator frequency allocation scenarios, intra-band continuous carrier aggregation may not always be possible. Accordingly, non-contiguous allocation may be arranged for one of intra-band or inter-band. Under intra-band non-continuous, the aggregated CCs 220 belong to the same frequency band, but include a gap or gaps in between. Under inter-band non-continuous aggregation, the aggregated CCs 220 belong to different operating frequency bands.

FIG. 1 shows a number of serving cells 118, 120 each associated with a corresponding CC 220. The coverage for each serving cell 118, 120 may differ due to the CCs 220 on different frequency bands experiencing different pathloss from each other. A Primary CC (PCC) 220P (i.e., DL PCC and UL PCC) serves a Primary serving cell (PSC) 118 configured to handle functionalities of Radio Resource Control (RRC) connection between an eNB 102 and a UE 104, as well as transfer of data 208 (FIG. 2B) between the eNB 102 and the UE 104. The UE 104 may also receive non-access stratum (NAS) information, such as security parameters, on the DLL PCC 220P. The UE 104 may operate in idle mode and listen for system information on the DL PCC 220P and send a physical uplink control channel (PUCCH) to the eNB 102 on the UL PCC 220P. FIG. 1 also shows multiple Secondary CCs (SCCs) 220S, 220Sa-Sn each serving a corresponding Secondary serving cell (SSC) 120, 120a-n for handling the transfer of data 208 between the eNB 102 and the UE 104. The SCCs 220S may be added and removed depending upon current bandwidth needs of the network 100, while the PCC 220P may change at handover.

The network 100 may plan different CCs 220 to provide different coverage, i.e., serving cells 118, 120 with different sizes. The CCs 220 may experience different pathloss increasing with increasing frequency for inter-band carrier aggregation. In the example shown, a first network base station (e.g., eNB) 102a provides the PSC 118 on the PCC 220P, a first $SSC_1$ 120a on a first $SCC_1$ 220Sa, and at least one additional $SSC_n$ 120n on at least one additional $SCC_n$ 220Sn. The first network base station 102a may be in communication with a second network base station (e.g., eNB) 102b via the X2-interface 112. The second eNB 102b provides a second $SSC_2$ 120b on a second $SCC_3$ 220Sb.

The plurality of UEs 104, 104a-n each reside within one of the serving cells 118, 120. Here, first and second UEs 104a, 104b may use carrier aggregation on two CCs, i.e., the PCC 220P and the first $SCC_1$ 220Sa, to connect with the first eNB 102a, while at least one additional UE 104n may use carrier aggregation on all three CCs, i.e., the PCC 220P, the $SCC_1$ 220Sa, and the $SCC_n$ 220Sn, to connect with the first eNB 102a. In addition to residing within the PSC 118 and the first $SCC_1$ 220Sa provided by the first eNB 102a, a third UE 104c also resides within the second $SSC_2$ 120b provided by the second eNB 102b. Accordingly, the third UE 104c may use carrier aggregation on the PCC 220P, the $SCC_1$ 220Sa, and the $SCC_2$ 220Sb to maintain two connections with the first and second eNBs 102a, 102b.

While LTE-Advanced supports carrier aggregation up to five CCs 220 in LTE Rel-10, and in the future will support up to thirty-two CCs 220 in LTE Rel-13, available network base stations 102 (e.g., eNBs) within the network 100 may support only three or four CCs 220. Moreover, UEs 104 in existence are only configured to support one or two downlink CCs 220, and only up to three downlink CCs 220 in the next couple of years. The UEs 104 are further limited to only supporting one or two uplink CCs 220. Accordingly, a single UE 104 is not capable of utilizing the full spectrum of carrier aggregation provided by LTE-Advanced.

Figure 2A:
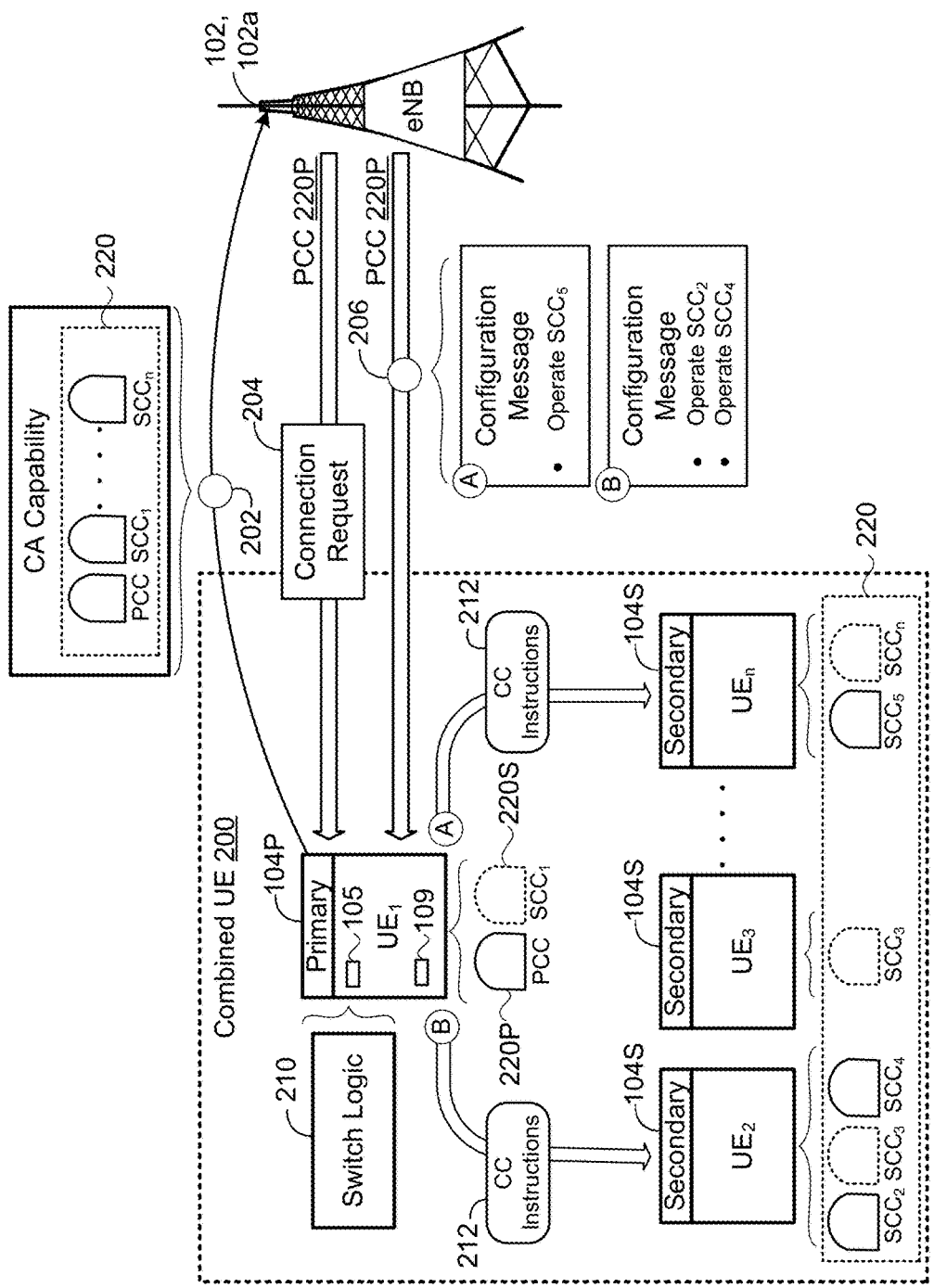
FIG. 2A is a schematic view of an example combined user equipment (UE) including a primary UE and a plurality of secondary UEs recognized by a network base station as a single UE.
Figure 2B:
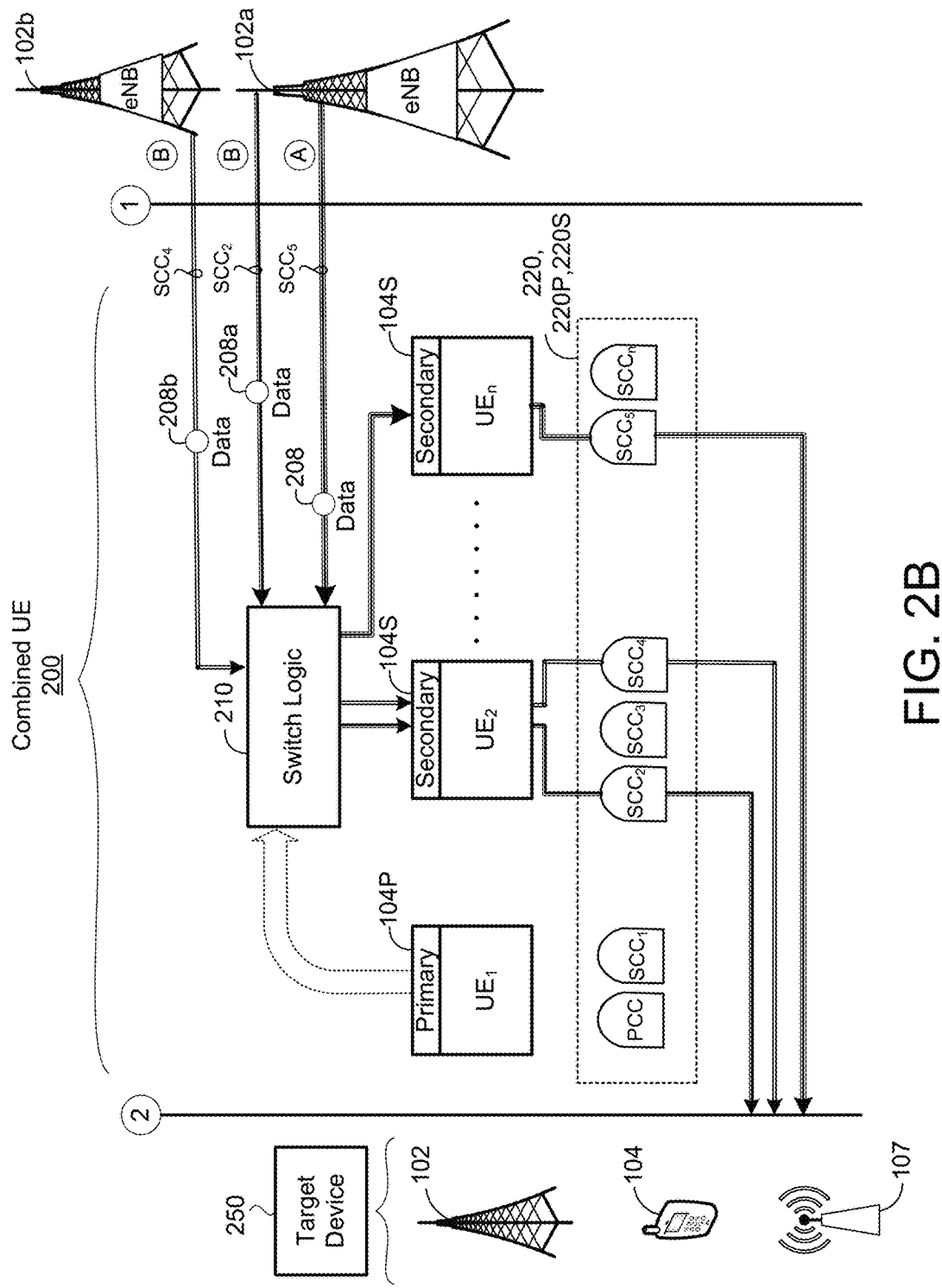
FIG. 2B is a schematic view of an example combined UE including a primary UE instructing at least one secondary UE to operate on at least one secondary component carrier and receive data from a network base station on the at least one secondary component carrier.

Referring to FIGS. 2A and 2B, in some implementations, at least two UEs 104 (e.g., $UE_1$-$UE_n$) cooperate to provide a combined UE 200 to leverage carrier aggregation capabilities supported by a network base station 102, 102a (e.g., eNB) within an LTE-Advanced network 100. Rather than the plurality of UEs 104 each performing their own cell search and establishing connections individually with the eNB 102a on a respective CC 220, the eNB 102a recognizes the combined UE 200 as a single UE associated with multiple CCs 220. $UE_1$ may be designated as a primary UE 104P for connecting with the eNB 102 on a PCC 220P, while the remaining at least one UE 104 (e.g., $UE_2$-$UE_n$) 104 of the combined UE 200 may be designated as a corresponding secondary UE 104S. The UEs 104 associated with the combined UE 200 may share a single network identity and may operate in a combined-UE operating state to enable cross-carrier aggregation between the combined UE 200 and the eNB 102a. In the example shown, the primary UE 104P includes data processing hardware 105 (e.g., circuitry, silicon chip, etc.) and memory hardware 109 in communication with the data processing hardware 105. The memory hardware 109 may store instructions that when executed on the data processing hardware 105 cause the data processing hardware 105 to perform operations for connecting with the eNB 102a and instruct secondary UEs 104S to operate on one or more SCCs 220S. Each UE 104 similarly includes associated data processing hardware 105 and memory hardware 109.

Referring to FIG. 2A, the primary UE 104P advertises a carrier aggregation (CA) capability 202 of the combined UE 200. The CA capability 202 includes a list of available CCs 220 (e.g., PCC, $SCC_1$-$SCC_n$) collectively supported by the combined UE 200. For instance, the primary UE 104P supports primary and secondary component carriers PCC, $SCC_1$; the secondary UE2 120S supports secondary component carriers $SCC_2$, $SCC_3$, $SCC_4$; the secondary $UE_3$ 120S supports secondary component carrier $SCC_3$; and the secondary $UE_n$ supports secondary component carriers $SCC_5$, $SCC_n$. As a whole, the combined UE 200, including the primary UE 104P and the plurality of secondary UEs 104S, advertises a CA capability 202 that includes the PCC 220P and each of the SCCs 220S ($SCC_1$-$SCC_n$).

The eNB 102a receives the CA capability 202 advertised by the combined UE 200 and provides a connection request 204 to the combined UE 200. In some examples, the connection request 204 requests communication with the combined UE 200 on the PCC 220P or one of the SCCs 220S. The primary UE 104P serves as a point of contact for the combined UE 200 and facilitates communications to and from the combined UE 200. In the example shown, the primary UE 104P receives the connection request 204 from the eNB 102a on the PCC 220P and connects to the eNB 102a on the PCC 220P in response to receiving the connection request 204.

Upon establishing the connection with the eNB 102a on the PCC 220P, the primary UE 104P may receive a configuration message 206 from the eNB 102a that instructs operation of at least one of the secondary CCs 220S, i.e., at least one of the $SCC_1$-$SCC_n$. In some implementations, the switch logic 210 (e.g., software application) executes on the data processing hardware 105 of the primary UE 104P for at least one of configuring, enabling, or disabling at least one SCC 220S supported by the combined UE 200 and associated with at least one of the secondary UEs 104S. For instance, the switch logic 210 allows the primary UE 104P to receive the configuration message 206 from the eNB 102a and instruct the at least one secondary UE 104S to operate on the at least one SCC 220S and receive data 208 (FIG. 2B) from the eNB 102a on the at least one SCC 220S. Accordingly, the eNB 102a may view the combined UE 200 as the single UE having the advertised CA capability 202 and the switch logic 210 executing on the primary UE 104P is responsible for routing the configuration message 206 to the appropriate secondary UE 104S for configuring the SCC 220S identified in the configuration message 206.

In an example, the primary UE 104P receives a first configuration message 206 (denoted "A" in FIG. 2A) on the PCC 220P from the eNB 102a that requests operation of the fifth $SCC_5$ 220S. In response to receiving the first configuration message 206, the primary UE 104P identifies the secondary $UE_n$ 104S associated with the fifth $SCC_5$ 220S and provides CC instructions 212 (denoted "A" in FIG. 2A) to the secondary $UE_n$ 104S. The CC instructions 212 instruct the secondary $UE_n$ 104S to operate on the fifth $SCC_5$ 220S and receive data 208 from the eNB 102 on the fifth $SCC_5$ 220S. In some examples, the CC instructions 212 received by the secondary $UE_n$ 104S enable the combined-UE operating state of the secondary UEn 104S to allow cross-carrier aggregation of the combined UE 200 including the primary UE 104P and the plurality of secondary UEs 104S. Accordingly, the CC instructions 212 provided to the secondary $UE_n$ 104S enables the secondary $UE_n$ 104S to receive the data 208 from the eNB 102a on the fifth $SCC_5$ 220S.

In some implementations, after enabling the secondary $UE_n$ 104S to operate on the fifth $SCC_5$ 220S, the switch logic 210 executing on the primary $UE_1$ 104P schedules the transmission of the data 208 on the fifth $SCC_5$ 220S from the eNB 102 to the secondary $UE_n$ 104S. For instance, FIG. 2B shows the switch logic 210 enabling the secondary $UE_n$ 104S to operate on the fifth $SCC_5$ 220S to receive the data 208 transmitted from the eNB 102a (denoted "A" in FIG. 2B). In some examples, CC instructions 212 (FIG. 2A) provided to the secondary $UE_n$ 104S further instruct the secondary UEn 104S to send the received data 208 from the eNB 102a to a target device 250. The target device 250 may include another eNB 102, another UE 104, or a wireless node (e.g., access point) 107. In the example shown, the secondary UEn 104S receives the data 208 from the eNB 102 on the fifth $SCC_5$ 220S and subsequently sends the received data 208 to the target device 250. Accordingly, the combined UE 200 routes data 208 transmitted from the eNB 102 at point "1" to the target device 250 at point "2" by instructing one of the secondary UEs 104S (e.g., $UE_n$) to operate on the fifth $SCC_5$ 220S. In other examples, secondary $UE_n$ 104S corresponds to a destination for the received data 208 and simply decodes the data 208 without further routing to the target device 250.

Figure 3A:
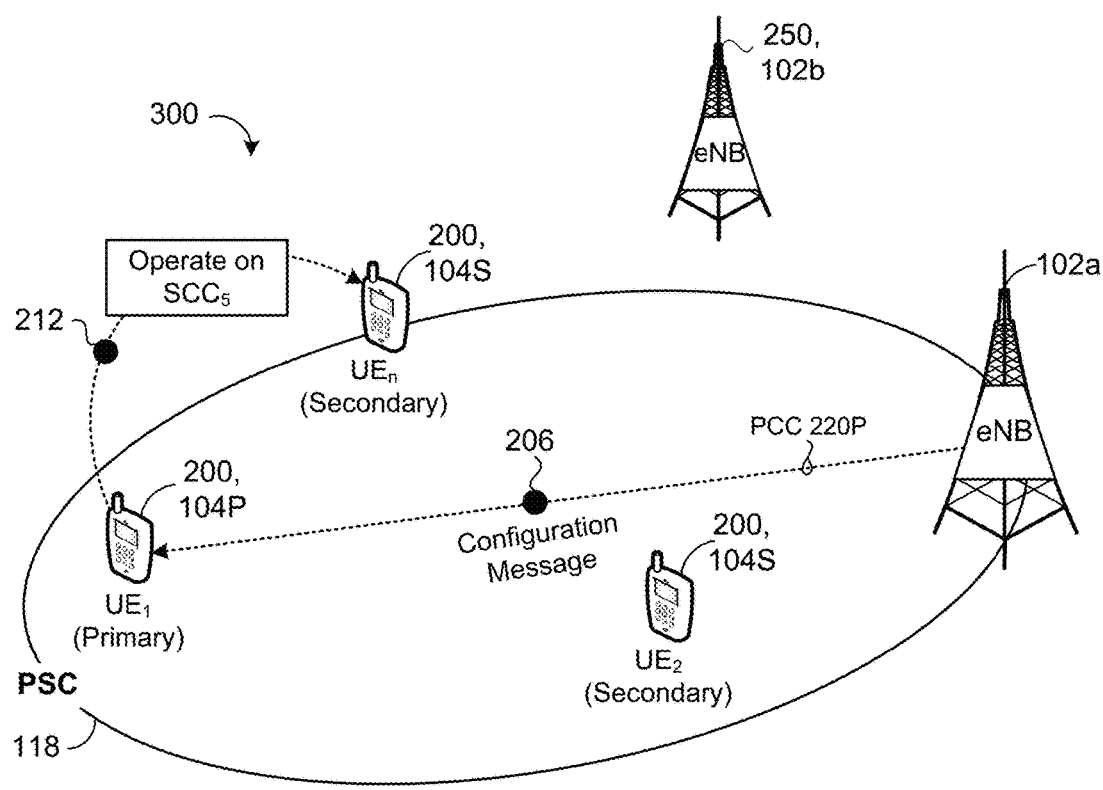
FIG. 3A is a schematic view of an example network environment showing a primary UE of a combined UE receiving a configuration message from a network base station on a primary component carrier.
Figure 3B:
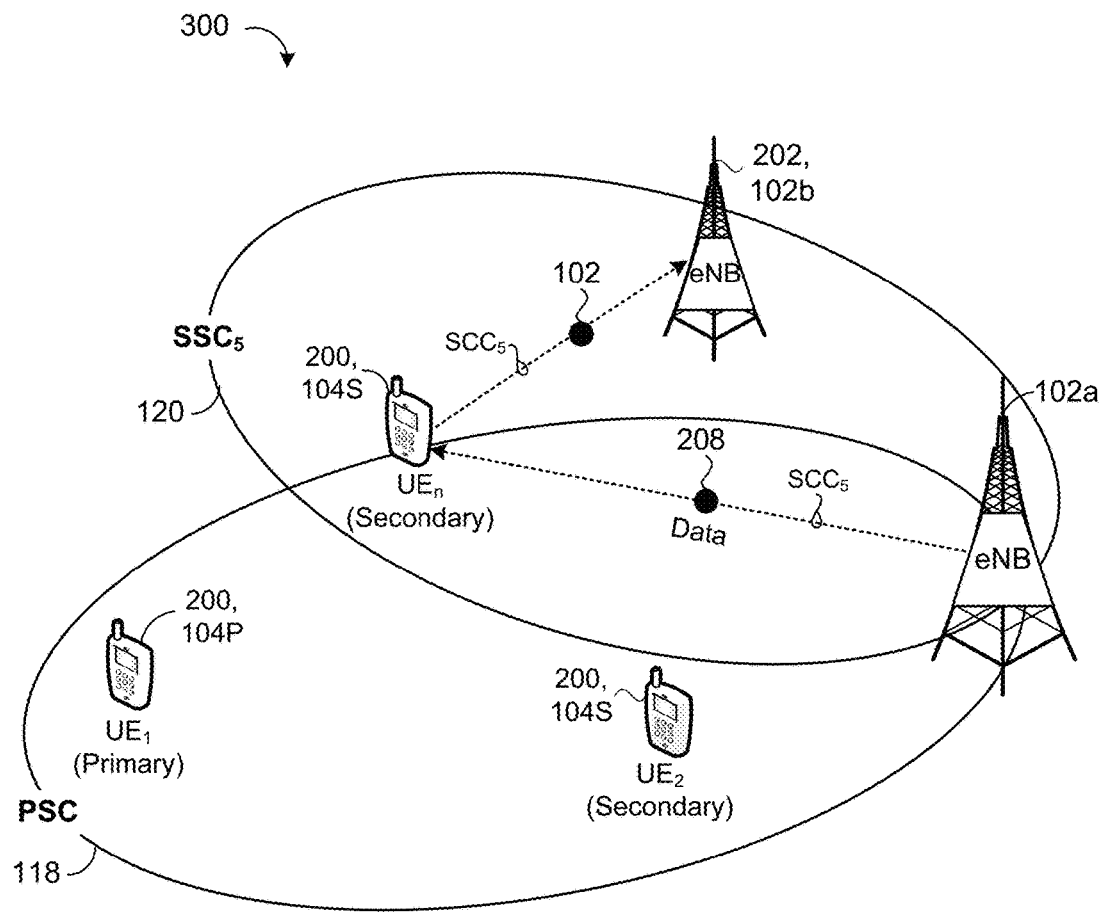
FIG. 3B is a schematic view of an example network environment showing a primary UE of a combined UE instructing a secondary UE to operate on a secondary component carrier and the secondary UE receiving data from a network base station on the secondary component carrier.

FIGS. 3A and 3B provide an example network environment 300 including operation of the of the combined UE 200 of FIGS. 2A and 2B in response to receiving the first configuration message 206 (denoted "A" in FIG. 2A) requesting operation on the fifth $SCC_5$ 220S. FIG. 3A shows the primary $UE_1$ 104P of the combined UE 200 receiving the configuration message 206 from the eNB 102a on the PCC 220P. The PCC 220P serves a corresponding PSC 118 and the primary $UE_1$ 104P is located within the PSC 118. In response to receiving the configuration message 206, the primary $UE_1$ 104P instructs the secondary $UE_n$ 104S to operate on the fifth $SCC_5$ 220S. For instance, the primary $UE_1$ 104P provides the CC instructions 212 (denoted "A" in FIG. 2A) to the secondary $UE_n$ 104S. Here, the secondary $UE_n$ 104S may receive the CC instructions 212 while operating in an idle mode. The CC instructions 212 instruct enabling the secondary $UE_n$ 104S to receive the data 208 from the eNB 102a on the fifth $SCC_5$ 220S.

After instructing the secondary $UE_n$ 104S to operate on the fifth $SCC_5$ 220S, FIG. 3B shows the secondary $UE_n$ 104S receiving the data 208 from the eNB 102a on the fifth $SCC_5$ 220S. Here, the enabled fifth $SCC_5$ 220S serves a corresponding $SSC_5$ 120 and the secondary $UE_n$ 104S is located within the $SSC_5$ 120. The coverage provided by the PSC 118 and the $SSC_5$ 120 may be different. The secondary $UE_n$ 104S establishes connection with the $SSC_5$ 120 via the eNB 102a to receive the data 208 on the fifth $SCC_5$ 220S. Thereafter, the secondary $UE_n$ 104S operating on the fifth $SCC_5$ 220S sends the received data 208 from the eNB 102a to the target device 250 including another eNB 102b. In some examples, the primary $UE_1$ 104P instructs (e.g., via the CC instructs 212) the secondary $UE_n$ 104S to send the received data 208 to the other eNB 102b.

In some implementations, the primary $UE_1$ 104P uses cross-carrier scheduling to schedule the transmission of the data 208 from the eNB 102a to the secondary $UE_n$ 104S on the fifth $SCC_5$ 220S. Thus, the eNB 102a may send low latency commands, such as DL and UL grants and/or timing and power control corrections, on the PCC 220P for execution by the secondary $UE_n$ 104S on the fifth $SCC_5$ 220S. Cross-carrier scheduling advantageously configures the fifth $SCC_5$ 220S in real time based on the configuration message 206 received on the PCC 220P. In some examples, the switch logic 210 executing on the primary $UE_1$ 104P provides the low latency commands received on the PCC 220P to the secondary $UE_n$ 104S in less than one millisecond to enable the fifth $SCC_5$ 220S and receive the data 208 from the eNB 102a thereon. In other implementations, the primary $UE_1$ 104P instructs the secondary $UE_n$ 104S to operate on the fifth $SCC_5$ 220S without cross-carrier scheduling such that the secondary $UE_n$ 104S performs a cell search to connect with the eNB 102a on the fifth $SCC_5$ 220S for receiving the data 208 therefrom.

The eNB 102a may provide separate configuration messages 206 to the combined UE 200 that instruct operation on other SCCs 220S associated with one or more of the primary $UE_1$ 104P and/or the other secondary UEs 104S. In doing so, the eNB 102a may aggregate multiple SCCs 220S for transmitting data 208 and the switch logic 210 executing on the primary $UE_1$ 104P may route the data 208 on each corresponding SCC 220S to the associated one of the UEs 104 of the combined UE 200. Each UE 104 receiving the data 208 on the associated SCC 220S may separately send the received data 208 to the target device 250 that includes the other eNB 102b. Thus, the multiple UEs 104 of the combined UE 200 each receiving the data 208 and sending the received data 208 to the target device 250 provides multiple receive antennas to execute uplink multiple-input multiple-output (MIMO) data 208 transmissions to the target device 250. Accordingly, the enabling of the combined-UE operating state to allow cross-carrier aggregation of the combined UE 200, increases the number of uplink and downlink carriers aggregated compared the number of aggregated carriers permitted by only a single UE 104 due to battery power and mobility constraints.

Referring back to FIGS. 2A and 2B, in some implementations, the primary $UE_1$ 104P also receives a second configuration message 206 (denoted "B" in FIG. 2A) on the PCC 220P from the eNB 102a that requests operation of the second $SCC_2$ and the fourth $SCC_4$. The primary $UE_1$ 104P may receive the first and second configuration messages 206 concurrently or separately. In response to receiving the first configuration message 206, the primary $UE_1$ 104P identifies the secondary $UE_2$ 104S associated with the second $SCC_2$ 220S and the fourth $SCC_4$ 220S and provides CC instructions 212 (denoted "B" in FIG. 2A) to the secondary $UE_2$ 104S. In some examples, the CC instructions 212 instruct the secondary $UE_n$ 104S to operate on the second $SCC_2$ 220S and receive data 208a from the eNB 102a on the second $SCC_2$ 220S, and to operate on the fourth $SCC_4$ 220S to receive data 208b from another eNB 102b. In some examples, the CC instructions 212 received by the secondary $UE_2$ 104S enable the combined-UE operating state of the secondary $UE_2$ 104S to allow cross-carrier aggregation of the combined UE 200 including the primary UE 104P and the plurality of secondary UEs 104S. Accordingly, the CC instructions 212 provided to the secondary $UE_2$ 104S enables the secondary $UE_n$ 104S to receive the data 208a from the eNB 102a on the second $SCC_2$ 220S and to receive the data 208b from the other eNB 102b on the fourth $SCC_4$ 220S.

In some examples, after enabling the secondary $UE_2$ 104S to operate on the second $SCC_2$ 220S and the fourth $SCC_4$ 220S, the switch logic 210 executing on the primary $UE_1$ 104P schedules the transmission of the data 208a on the second $SCC_2$ 220S from the eNB 102a to the secondary $UE_2$ 104S and the transmission of the data 208b on the fourth $SCC_4$ 220S from the eNB 102b to the secondary $UE_2$ 104S. For instance, FIG. 2B shows the switch logic 210 enabling the secondary $UE_2$ 104S to operate on the second $SCC_2$ 220S to receive the data 208a transmitted from the eNB 102a (denoted "B" in FIG. 2B). FIG. 2B also shows the switch logic 210 enabling the secondary $UE_2$ 104S to operate on the fourth $SCC_4$ 220S to receive the data 208b transmitted from the eNB 102b. In some examples, CC instructions 212 (FIG. 2A) provided to the secondary $UE_2$ 104S further instruct the secondary $UE_2$ 104S to send the received data 208a from the eNB 102a and the received data 208b from the eNB 102b to a target device 250. The target device 250 may include another eNB 102, another UE 104, or a wireless node (e.g., access point) 107. In the example shown, the secondary $UE_2$ 104S receives the data 208a from the eNB 102a on the second $SCC_2$ 220S, receives the data 208b from the eNB 102b on the fourth $SCC_4$ 220S, and subsequently sends the received data 208a, 208b to the target device 250. The secondary $UE_2$ 104S may send the received data 208a, 208b to the target device 250 separately or together. Accordingly, the combined UE 200 routes the data 208a, 208b transmitted from the eNBs 102a, 102b at point "1" to the target device 250 at point "2" by instructing one of the secondary UEs 104S (e.g., $UE_2$) to operate on both the second $SCC_2$ 220S and the fourth $SCC_4$ 220S.

Figure 4A:
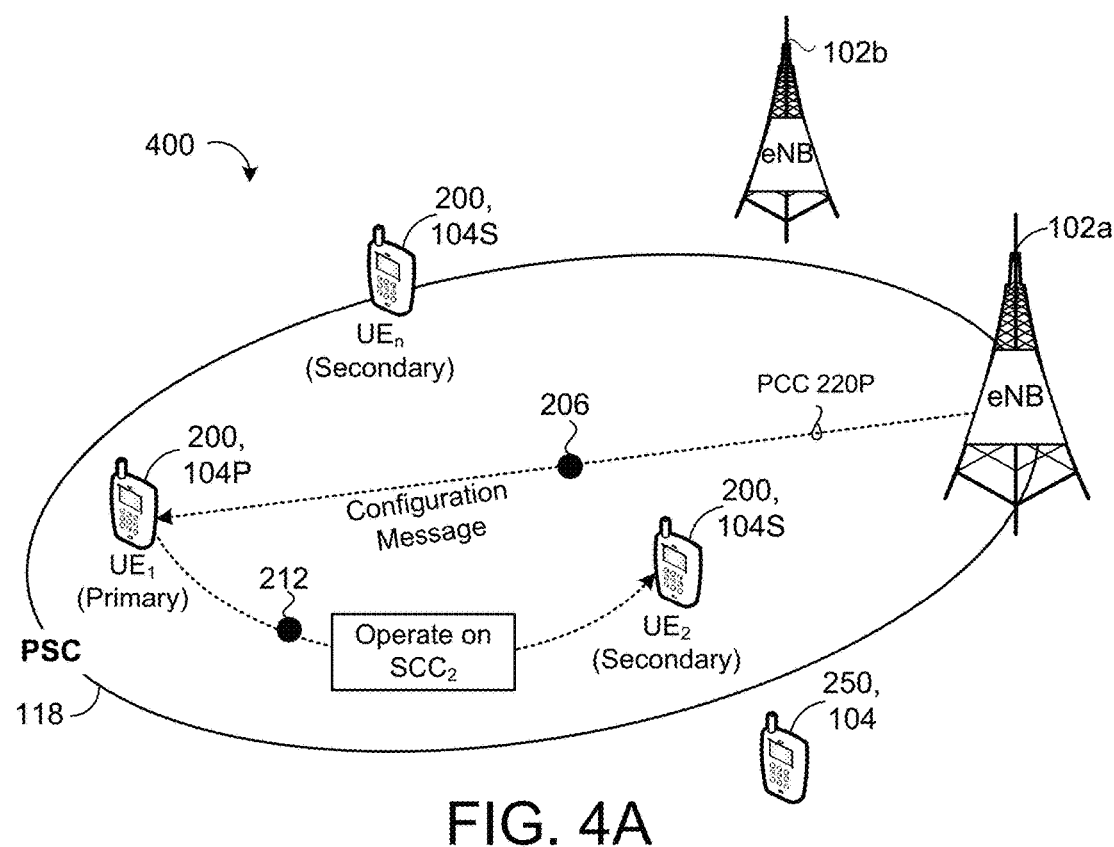
FIG. 4A is a schematic view of an example network environment showing a primary UE of a combined UE receiving a configuration message from a network base station on a primary component carrier.
Figure 4B:
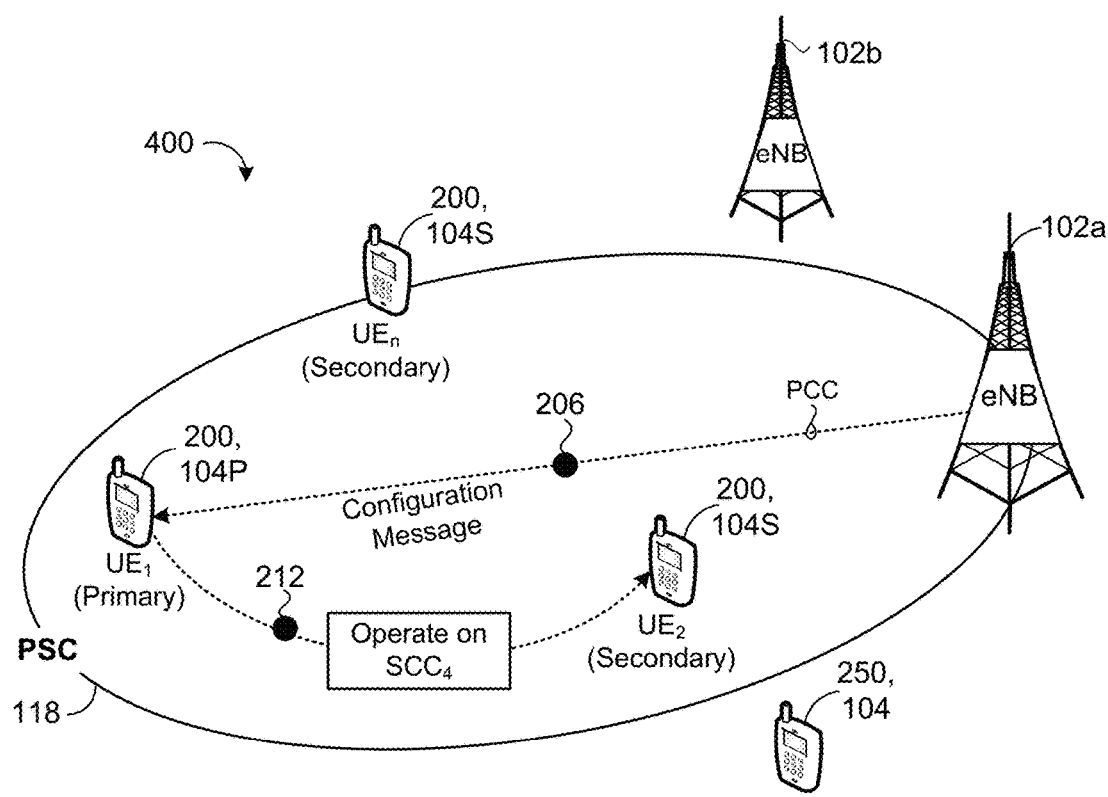
FIGS. 4B and 4C are schematic views of an example network showing a primary UE instructing a secondary UE to operate on two secondary component carriers.

FIGS. 4A-4D provide an example network environment 400 including operation of the combined UE 200 of FIGS. 2A and 2B in response to receiving the second configuration message 206 (denoted "B" in FIG. 2A) requesting operation on the second $SCC_2$ 220S and the fourth $SCC_4$ 220S. FIGS. 4A and 4B show the primary $UE_1$ 104P of the combined UE 200 receiving the configuration message 206 from the eNB 102a on the PCC 220P. The PCC 220P serves the corresponding PSC 118 and the primary $UE_1$ 104P is located within the PSC 118. In response to receiving the configuration message 206, the primary $UE_1$ 104P instructs the secondary $UE_2$ 104S to operate on the second $SCC_2$ 220S (FIG. 4A) and also instructs the secondary $UE_2$ 104S to operate on the fourth $SCC_4$ 220S (FIG. 4B). For instance, the primary $UE_1$ 104P provides the CC instructions 212 (denoted "B" in FIG. 2A) to the secondary $UE_2$ 104S. Here, the secondary $UE_2$ 104S may receive the CC instructions 212 while operating in an idle mode. The CC instructions 212 instruct enabling the secondary $UE_2$ 104S to receive the data 208a from the eNB 102a on the second $SCC_2$ 220S and to receive the data 208b from the other eNB 102b on the fourth $SCC_4$ 220S. In some examples, the primary $UE_1$ 104P provides a single set of CC instructions 212 to the secondary $UE_2$ 104S to instruct the secondary $UE_2$ 104S to operate on both the second $SCC_2$ 220S and the fourth $SCC_4$ 220S for receiving the data 208a, 208b from the associated eNB 102a, 102b. In other examples, the primary $UE_1$ 104P provides separate CC instructions 212 to the secondary $UE_2$ 104S each instructing the secondary $UE_2$ 104S to operate on the associated one of the second $SCC_2$ 220S or the fourth $SCC_4$ 220S.

Figure 4C:
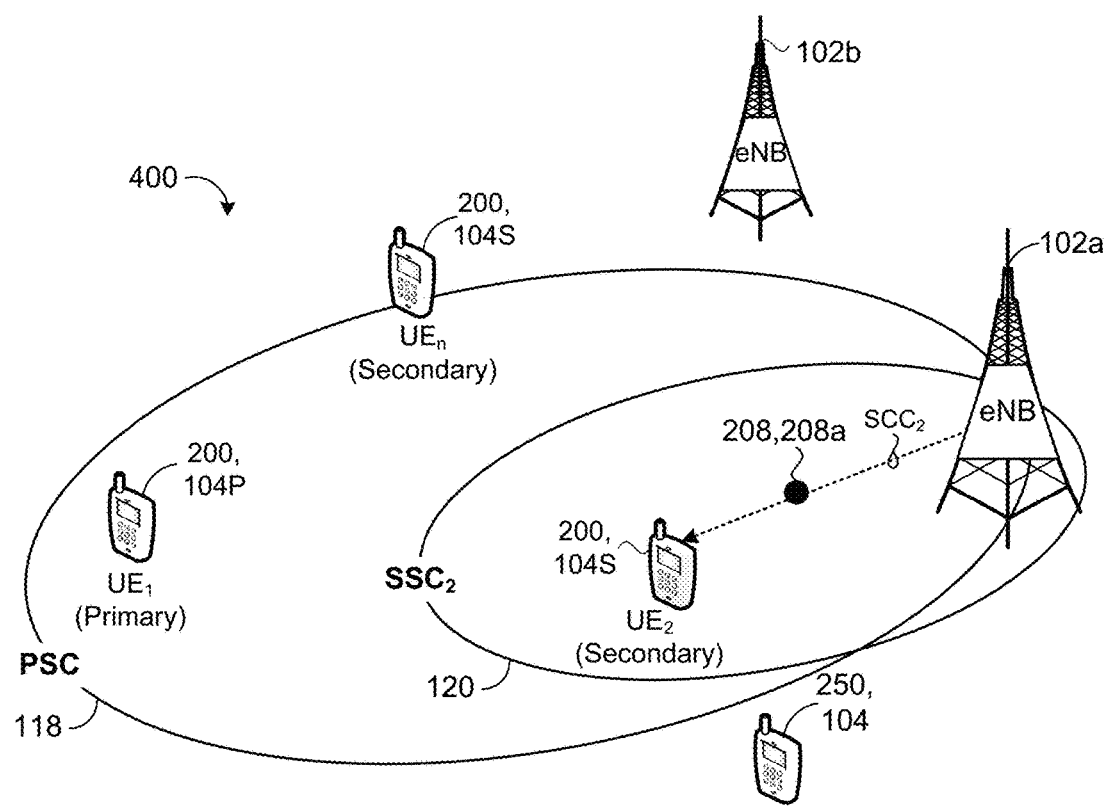

After instructing the secondary $UE_2$ 104S to operate on the second $SCC_2$ 220S, FIG. 4C shows the secondary $UE_2$ 104S receiving the data 208a from the eNB 102a on the second $SCC_2$ 220S. Here, the enabled second $SCC_2$ 220S serves a corresponding $SSC_2$ 220S and the second $SCC_2$ 220S is located within the $SSC_2$ 120. The $SSC_2$ 120 may provide a different coverage than the coverage provided by PSC 118. The secondary $UE_2$ 104S establishes connection with the $SSC_2$ 120 via the eNB 102a to receive the data 208a on the second $SCC_2$ 220S.

Figure 4D:
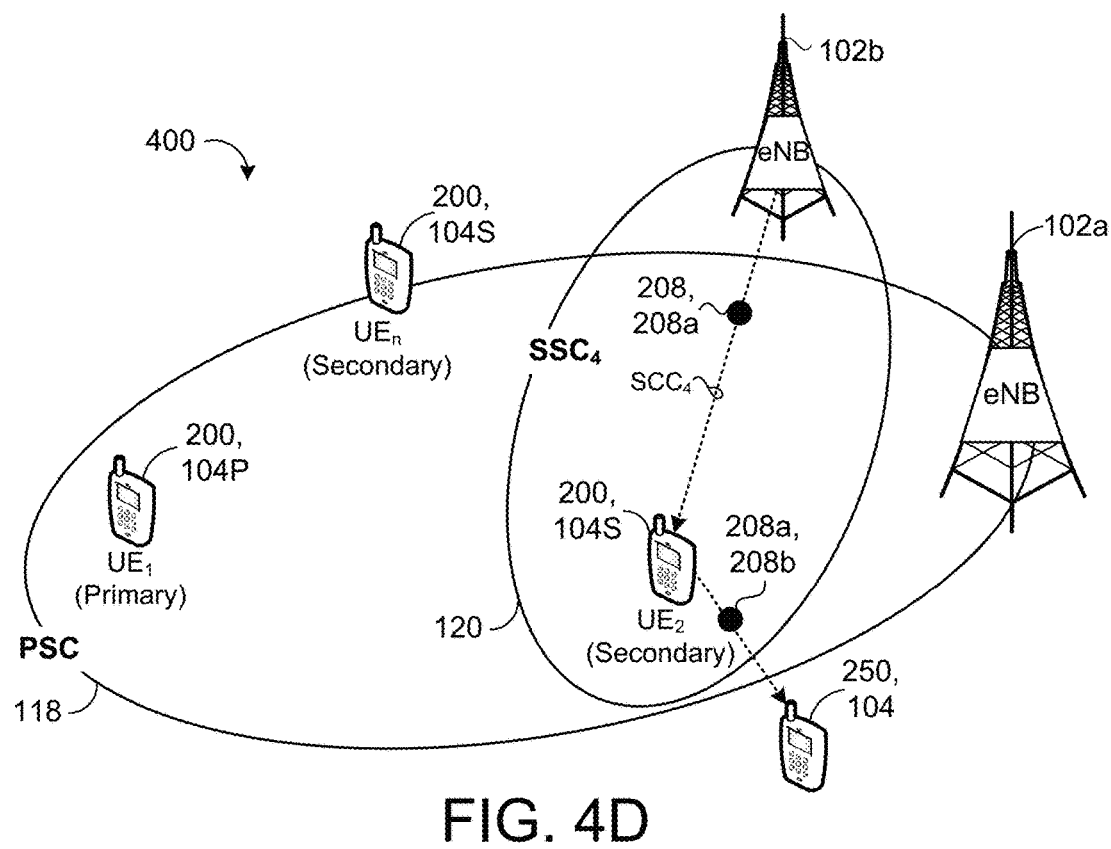
FIG. 4D is a schematic view of a secondary UE receiving data from a first network base station on a first secondary component carrier and receiving data from a second network base station on a second secondary component carrier.

Similarly, FIG. 4D shows the secondary $UE_2$ 104S receiving the data 208b from the other eNB 102b on the fourth $SCC_4$ 220S. In the example shown, the fourth $SCC_4$ 220S serves a corresponding $SSC_4$ 120 providing a different coverage to the secondary $UE_2$ 104S than the coverage provided to the secondary $UE_2$ 104S by the $SSC_2$ 120 served by the second $SCC_2$ 220S of FIG. 4C. The secondary $UE_2$ 104S establishes connection with the $SSC_4$ 120 via the eNB 102b to receive the data 208b on the fourth $SCC_4$ 220S. Accordingly, the secondary $UE_2$ 104S is dually connected to each of the eNBs 102a, 102b. Thereafter, the secondary $UE_2$ 104S operating on the second $SSC_2$ 220S sends the received data 208a, 208b from the eNBs 102a, 102b to the target device 250 including another UE 104. The other UE 104 associated with the target device 250 may be associated with the combined UE 200 or may be a distinct UE 104 having an associated network identity separately recognized by the eNB 102a. In some examples, the primary $UE_1$ 104P instructs (e.g., via the CC instructs 212) the secondary $UE_2$ 104S to send the received data 208a, 208b to the other UE 104 associated with the target device 250.

In some implementations, the primary $UE_1$ 104P uses cross-carrier scheduling to schedule the transmission of the data 208a from the eNB 102a to the secondary $UE_2$ 104S on the second $SCC_2$ 220S and/or the transmission of the data 208b from the eNB 102b to the secondary $UE_2$ 104S on the fourth $SCC_4$ 220S. Thus, eNB 102a may send low latency commands, such as DL and UL grants and/or timing and power control corrections, on the PCC 220P for execution by the secondary $UE_2$ 104S on the second $SCC_5$ 220S and/or the fourth $SCC_4$ 220S. In some examples, the switch logic 210 executing on the primary $UE_1$ 104P provides the low latency commands received on the PCC 220P to the secondary $UE_2$ 104S in less than one millisecond to concurrently or separately enabling the second $SCC_2$ 220S for receiving the data 208a from the eNB 102a and enabling the fourth $SCC_4$ 220S for receiving the data 208b from the other eNB 102b. In other implementations, the primary $UE_1$ 104P instructs the secondary $UE_2$ 104S to operate on the second $SSC_2$ 220S and the fourth $SSC_4$ 220S without cross-carrier scheduling such that the secondary $UE_2$ 104S performs cell searches to connect with the eNBs 102a, 102b for receiving the associated data 208a, 208b.

Figure 5A:
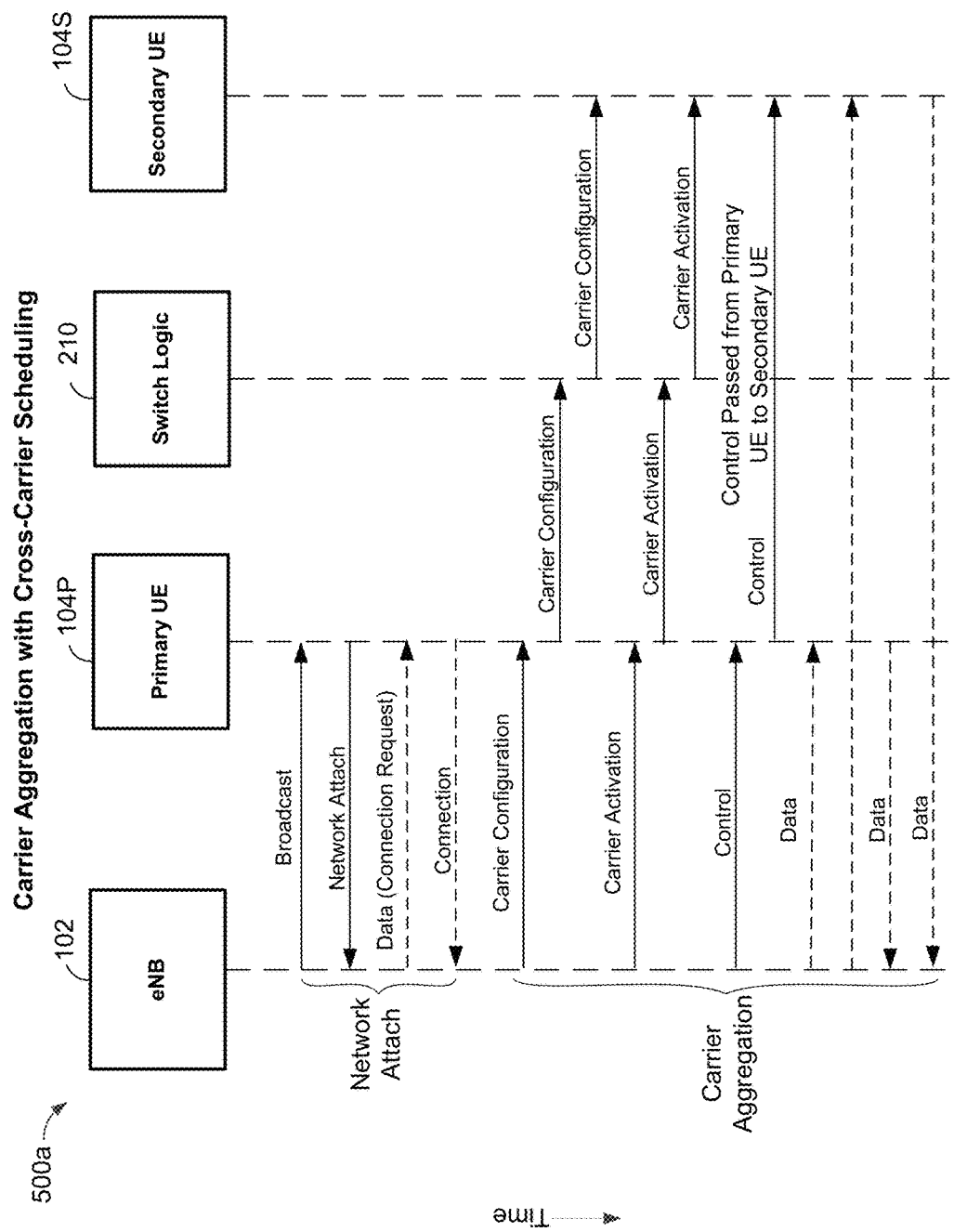
FIG. 5A is a schematic view of example operations performed by a primary UE of a combined UE for carrier aggregation with cross-carrier scheduling.
Figure 5B:
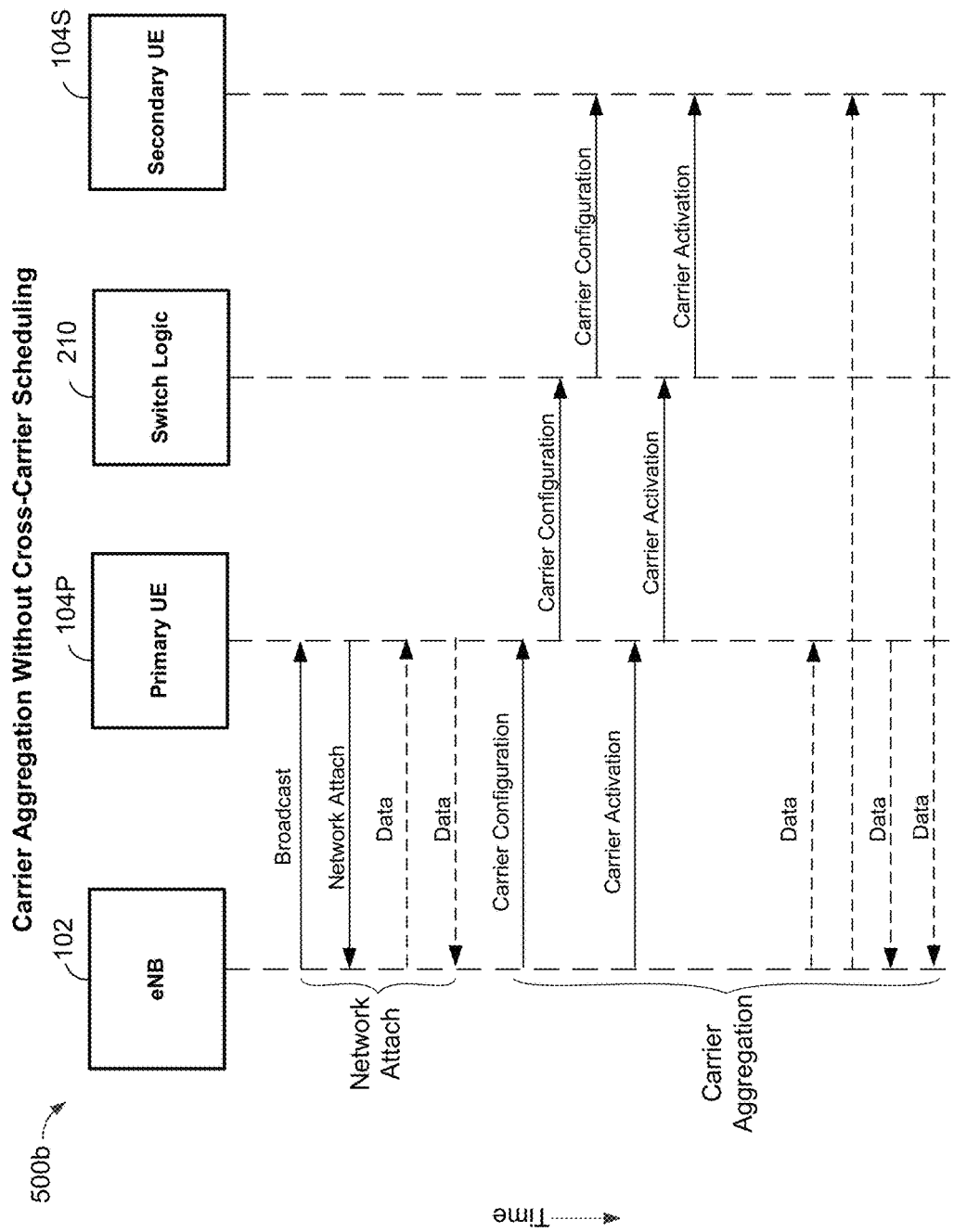
FIG. 5B is a schematic view of example operations performed by a primary UE of a combined UE for carrier aggregation with cross-carrier scheduling.

FIGS. 5A and 5B are diagrams 500a, 500b illustrating example operations performed by the primary UE 104P of the combined UE 200 for carrier aggregation with cross-carrier scheduling (FIG. 5A) and without cross-carrier scheduling (FIG. 5B). The diagrams may be described with reference to FIGS. 2A and 2B after the primary UE 104P advertises the carrier aggregation (CA) capability 202 for the combined UE 200. The vertical y-axis indicates time increasing from the top to the bottom. The eNB 102 and the primary UE 104P perform an initial network attach procedure ("Network Attach") to register the primary UE 104P, and more specifically, the combined UE, with the LTE network 100. Here, the eNB 102 broadcasts LTE signals and the primary UE 104P sends a network attach request from the eNB 102. In response to the network attach request from the primary UE 104P, the eNB 102 transmits downlink data including a connection request 204 to the primary UE 104P on a primary CC (PCC) 220P. The connection request 204 may request communicating on one of the PCC 220P or at least one secondary CC (SCC) 220S. The primary UE 104P then connects to the eNB 102 on the PCC 220P by transmitting uplink data to the eNB 102.

After primary UE 104P connects to the eNB 102 on the PCC 220P, the eNB 102 and the primary UE 104P perform a Carrier Aggregation procedure to configure at least one SCC 220S. The primary UE 104P receives a configuration message 206 from the eNB 102 instructing operation of the at least one SCC 220S. The primary UE 104P identifies at least one secondary UE 104S associated with the at least one SCC 220S. Thereafter, the primary UE 104P routes the configuration message 206 to the switch logic 210 executing on the data processing hardware 105 of the primary UE 104P, and the switch logic 210 routes the configuration message 206 to the at least one secondary UE 104S. Here, the switch logic 210 provides the CC instructions 212 to the at least one secondary UE 104S to operate on the at least one SCC 220S and receive data 208 from the eNB 102 on the at least one SCC 220S. Thereafter, the eNB 102 transmits a downlink carrier activation signal to the primary UE 104P to activate the at least one SCC 220S. The downlink carrier activation signal is passed to the switch logic 210 and onto the at least one secondary UE 104S.

In some examples, FIG. 5A shows the eNB 102 using cross-carrier scheduling to configure a target SCC 220S on the PCC 220P. For instance, the eNB 102 transmits a downlink control signal to the primary UE 104P on the PCC 220P that instructs the primary UE 104P to pass or handover control to the secondary UE 104S. The primary UE 104P may pass the control signal to the secondary UE 104S to enable the secondary UE 104S associated with the target SCC 220S to receive the data 208 from the eNB 102. By contrast, FIG. 5B omits the passing of the control signals and simply allows the secondary UE 104S to operate on the SCC 220S and connect with the eNB 102 to receive data therefrom.

The diagrams 500a, 500b both include the eNB 102 providing downlink data 208 to both the primary UE 104P on the PCC 220P and the secondary UE 104S on the SCC 220S. The primary UE 104P may provide uplink data 208 back to the eNB 102 on the PCC 220P and the secondary UE 104S may provide uplink data 208 back to the eNB 102 on the SCC 220S.

Figure 6A:
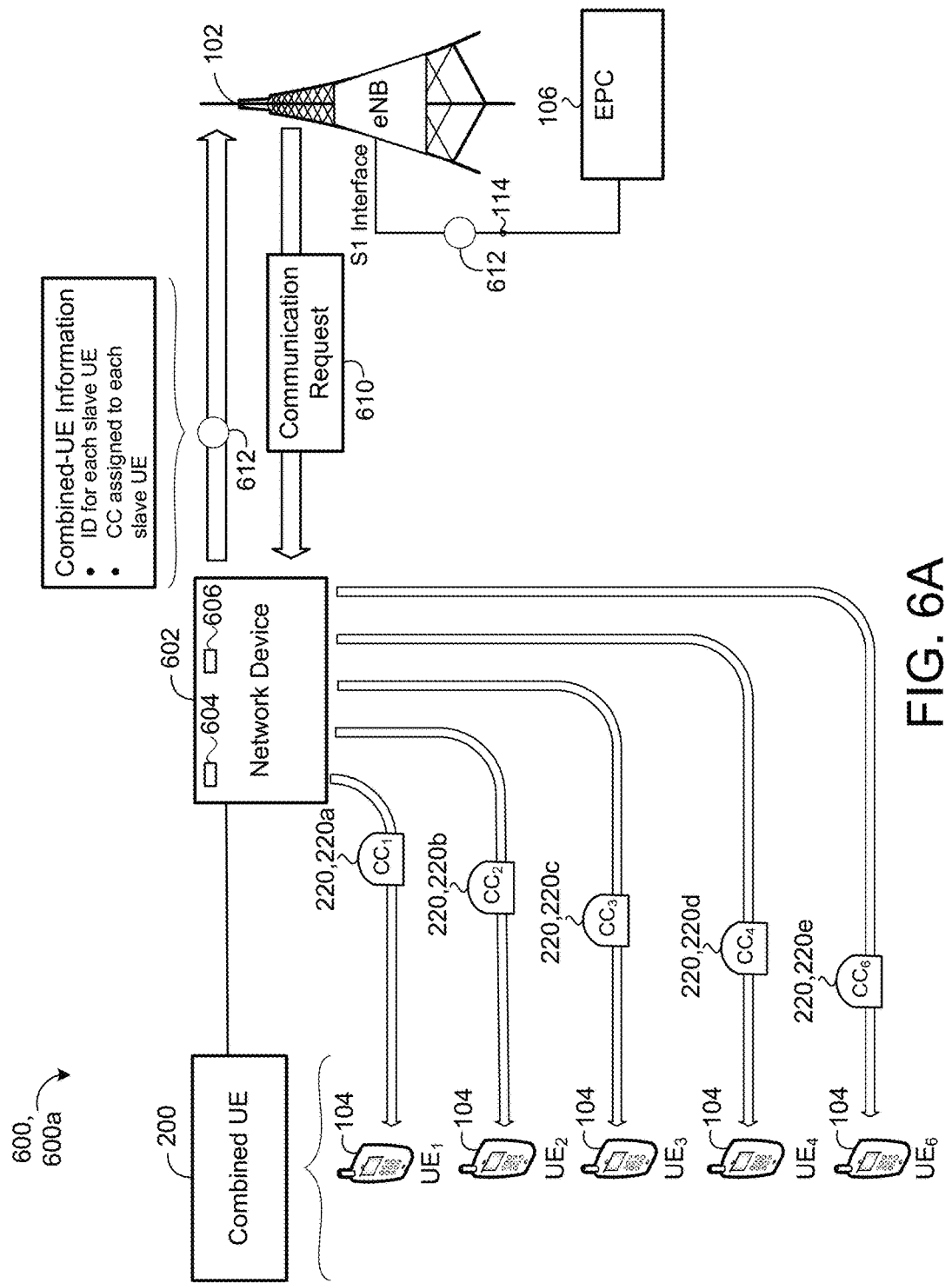
FIG. 6A is a schematic view of a network device receiving a communication request from a network base station for the delivery of data to a destination through a combined UE.
Figure 6B:
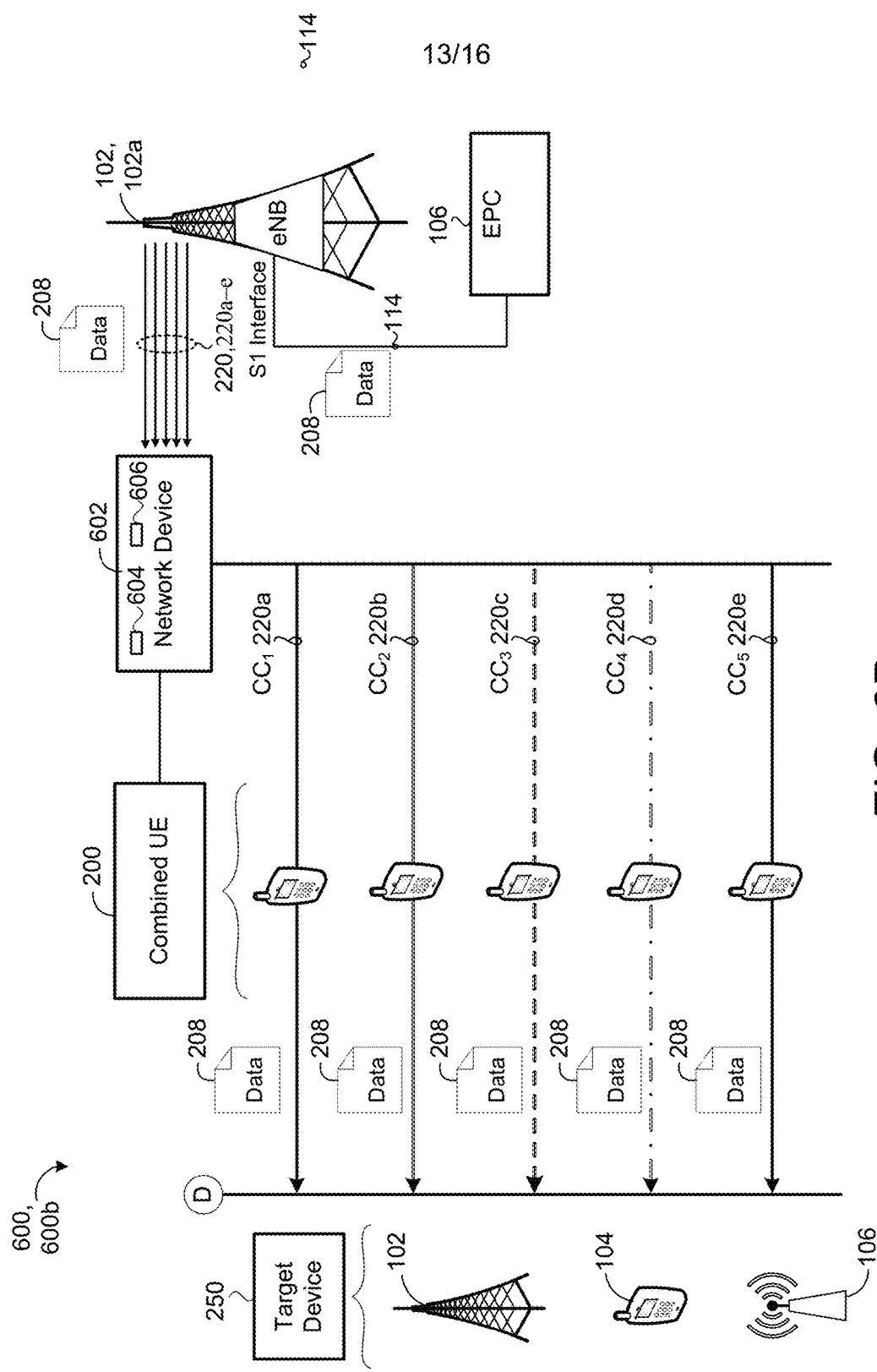
FIG. 6B is a schematic view of a network device routing a communication of data through a combined UE including slave UEs to a destination.

Referring to FIGS. 6A and 6B, in some implementations, a combined UE environment 600, 600a-b includes a network device 602 in communication with a combined UE 200 and a network base station (e.g., eNB) 102. The eNB 102 may communicate with the EPC 106 over the S1 interface 114. In some examples, the eNB 102 receives packets of data 208 from the EPC 106 and routes the data 208 through the combined UE 200 to a destination D. The destination D may include a target device 250, such as another eNB 102, another UE 104, or a wireless node (e.g., access point) 107. The network device 602 may include customer premises equipment (CPE) such as a router or modem configured to wirelessly connect to a plurality of UEs 104 and one or more eNBs 102. The network device 602 includes data processing hardware 604 and memory hardware 606 in communication with the data processing hardware 604. The memory hardware 606 may store instructions that when executed on the data processing hardware 604 cause the data processing hardware 604 to perform operations for connecting with the eNB 102 and routing data 208 through the combined UE 200.

Referring to FIG. 6A, in some implementations, the network device 602 receives a communication request 610 from the eNB 102 for delivery of data 208 (FIG. 6B) to the destination D (e.g., target device 250). The network device 602 is configured to route the data 208 associated with the communication request 610 through the combined UE 200 to the destination D. The combined UE 200 includes multiple slave UEs 104 (e.g., $UE_1$-$UE_5$) each having an associated component carrier (CC) 220. The network device 602 includes data processing hardware 604 and memory hardware 606 in communication with the data processing hardware 604. The memory hardware 606 may store instructions that when executed on the data processing hardware 604 cause the data processing hardware 604 to perform operations for connecting with the eNB 102 and each slave UE 104 to route the data 208 through the combined UE 200 to the destination D.

In some examples, the network device 602 assigns each slave UE 104 with an associated CC 220, 220a-e that is different from each other CC 220 associated with each other slave UE 104. Accordingly, the combined UE 200 may place each slave UE 104 on a separate CC 220 so that each of the CCs 220 may be aggregated to utilize more of the wireless spectrum, and thereby increase a threshold efficiency in a fixed wireless access service (e.g., Citizens Broadband Radio Service (CBRS) band). In the example shown, the combined UE 200 includes five slave UEs 104 to allow up to five (5) CCs 220 to be aggregated. However, other examples may include a combined UE 200 including more slave UEs 104 for aggregating more than five (5) CCs 220. While the combined UE 200 may be recognized by the eNB 102 as a single UE associated with the CCs 220 of the slave UEs 104, each slave UE 104 may include an associated network identity that is different from each other network identity associated with each other slave UE 104.

The network device 602 may provide combined-UE information 612 to the eNB 102. The combined-UE information 612 may include the network identity for each slave UE 104 of the combined UE 200 and/or each associated CC 220, 220a-e assigned to the slave UEs 104 of the combined UE 200. The eNB 102 may receive the combined-UE information 612. In some examples, the eNB 102 tracks each slave UE 104 using the associated network identity and associated CC 220 to ensure that the slave UEs 104 remain on separate CCs 220. Maintaining the slave UEs 104 on separate CCs 220 insures that bandwidth is not shared between physical layer resources offered by each slave UE 104 of the combined UE 200. Moreover, the eNB 102 may provide the combined-UE information 612 to the EPC 106 via the S1-Interface 114 to allow the EPC 106 (and PGW) to track each slave UE 104 using the associated network identity. In some examples, the EPC 106 tracks each slave UE 104 using the associated network identity to allow packets of data 208 scheduled for transmission on one slave UE 104 to be rerouted to another slave UE 104.

FIG. 6B shows the network device 602 (e.g., via the data processing hardware 604) routing the communication of data 208 through multiple slave UEs 104 of the combined UE 200 to the destination D (e.g., target device 250). In some implementations, the network device 602 routes the communication of data 208 by identifying at least one target slave UE 104 for routing the data 208 based on the CC 220 associated with the at least one target slave UE 104. Thereafter, the network device 602 schedules the routing of the communication of data 208 through the identified at least one target slave UE 104. In the example shown, the network device identifies multiple target slave UEs 104 (UE$_1$-UE$_5$) and schedules concurrent routing of the communication of data 208 through the identified multiple target slave UEs 104. For example, the eNB 102 may send the communication of data 208 across multiple CCs 220a-n each associated with one of the identified multiple target slave UEs 104 of the combined UE 200. The network device 602 may route the communication of data 208 on each CC 220a-n through the target slave UE 104 associated with the CC 220a-n.

Figure 7:
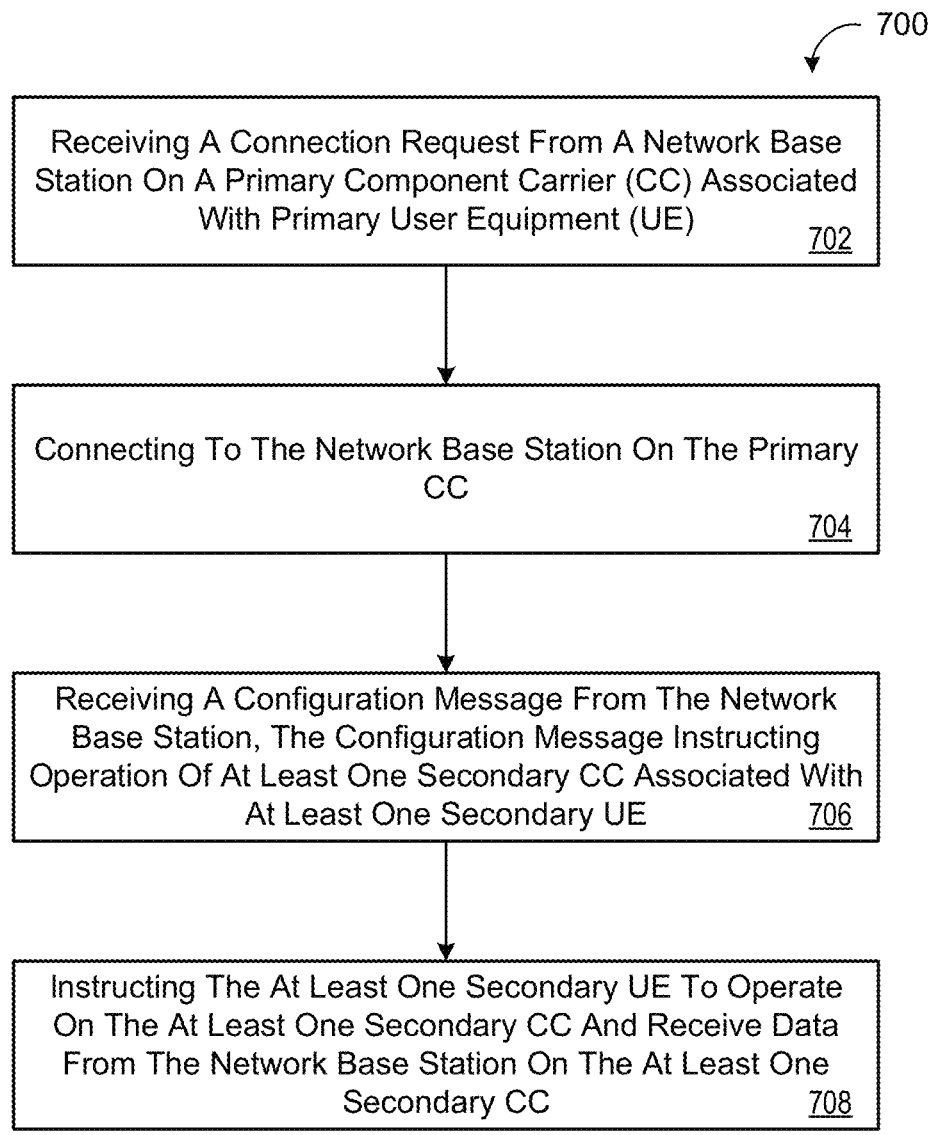
FIG. 7 is a schematic view of an example arrangement of operations for a method of instructing at least one secondary UE to operate on at least one secondary component carrier and to receive data from a network base station on the at least one secondary component carrier.

FIG. 7 provides an example arrangement of operations for a method 700 of instructing at least one secondary UE 104S to operate on at least one secondary component carrier (SCC) 220S and receive data from a network base station 102 on the at least one SCC 220S. At block 702, the method 700 includes receiving, at data processing hardware 105 of the primary UE 104P, a connection request 204 from the network base station 102a on a primary component carrier (PCC) 220P associated with the primary UE 104P. At block 704, the method 700 includes connecting, by the data processing hardware 105, to the network base station 102 on the PCC 220P. At block 706, the method 700 includes receiving, at the data processing hardware 105, a configuration message 206 from the network base station 102. The configuration message 206 instructs operation of the at least one SCC 220S. The at least one SCC 220S is associated with at least one secondary UE 104S. At block 708, in response to receiving the configuration message 206, the method 700 includes, instructing, by the data processing hardware 105, the at least one secondary UE 104S to operate on the at least one SCC 220S and receive data 208 from the network base station 102 on the at least one SCC 220S.

Figure 8:
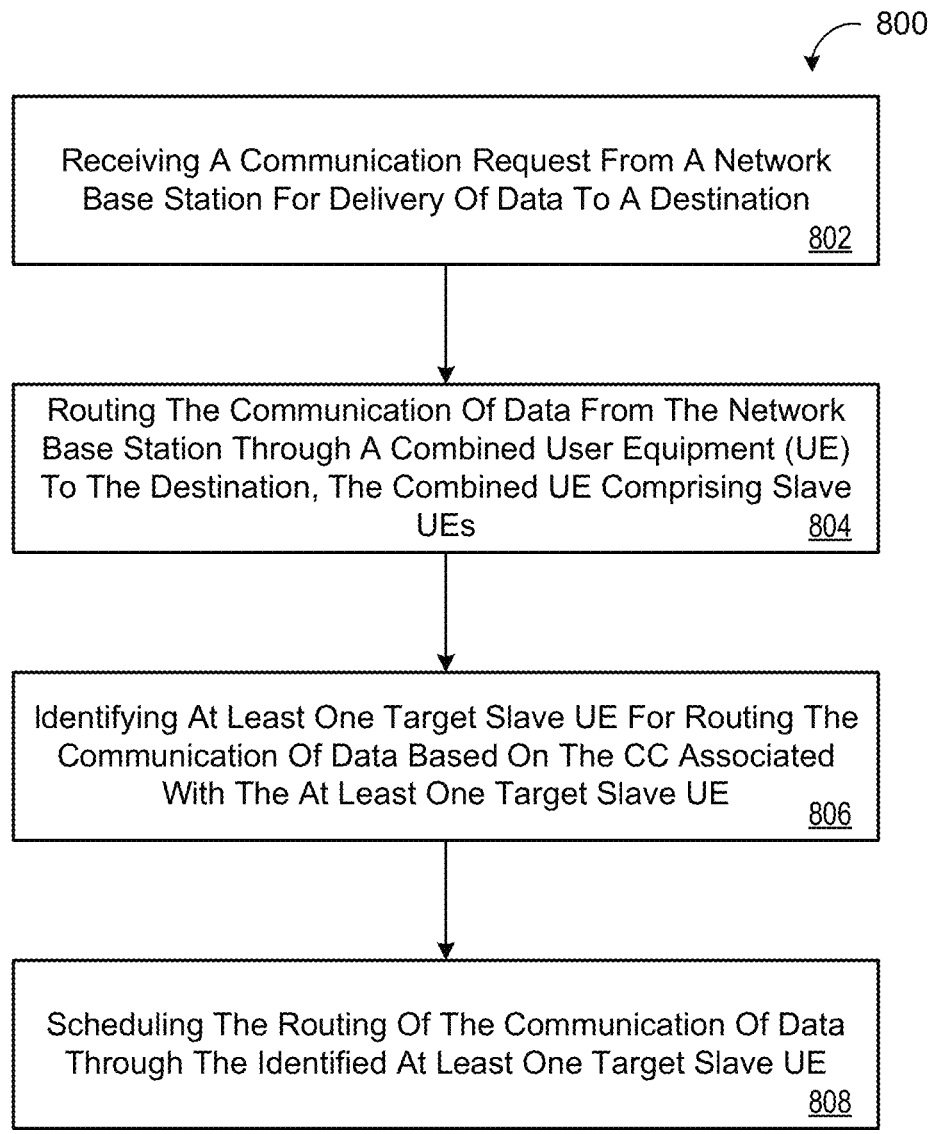
FIG. 8 is a schematic view of an example arrangement of operations for a method of routing a communication of data from a network base station through a combined UE to a destination.

FIG. 8 provides an example arrangement of operations for a method 800 of routing a communication of data from a network base station 102 through a combined user equipment (UE) 200 to a destination D. The destination may include a target device 250 such as, but not limited to, another network base station 102, another UE 104, or a wireless node (e.g., access point) 107. At block 802, the method 800 includes receiving, at data processing hardware 604, a communication request 610 from the network base station 102 for delivery of data 208 to the destination D. At block 804, the method 800 includes routing, by the data processing hardware 604, the communication of data 208 from the network base station 102 through the combined UE 200 to the destination D. The combined UE includes slave UEs 104 each in communication with the data processing hardware 604 and having an associated component carrier (CC) 220, 220a-e. The combined UE 200 is recognized by the network base station 102 as a single UE associated with the CCs 220a-e of the slave UEs 104. At block 806, the method 800 includes identifying at least one target slave UE 104 for routing the communication of data 208 based on the CC 220 associated with the at least one target slave UE 104. At block 808, the method includes scheduling the routing of the communication of data 208 through the identified at least one target slave UE 104.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 9:
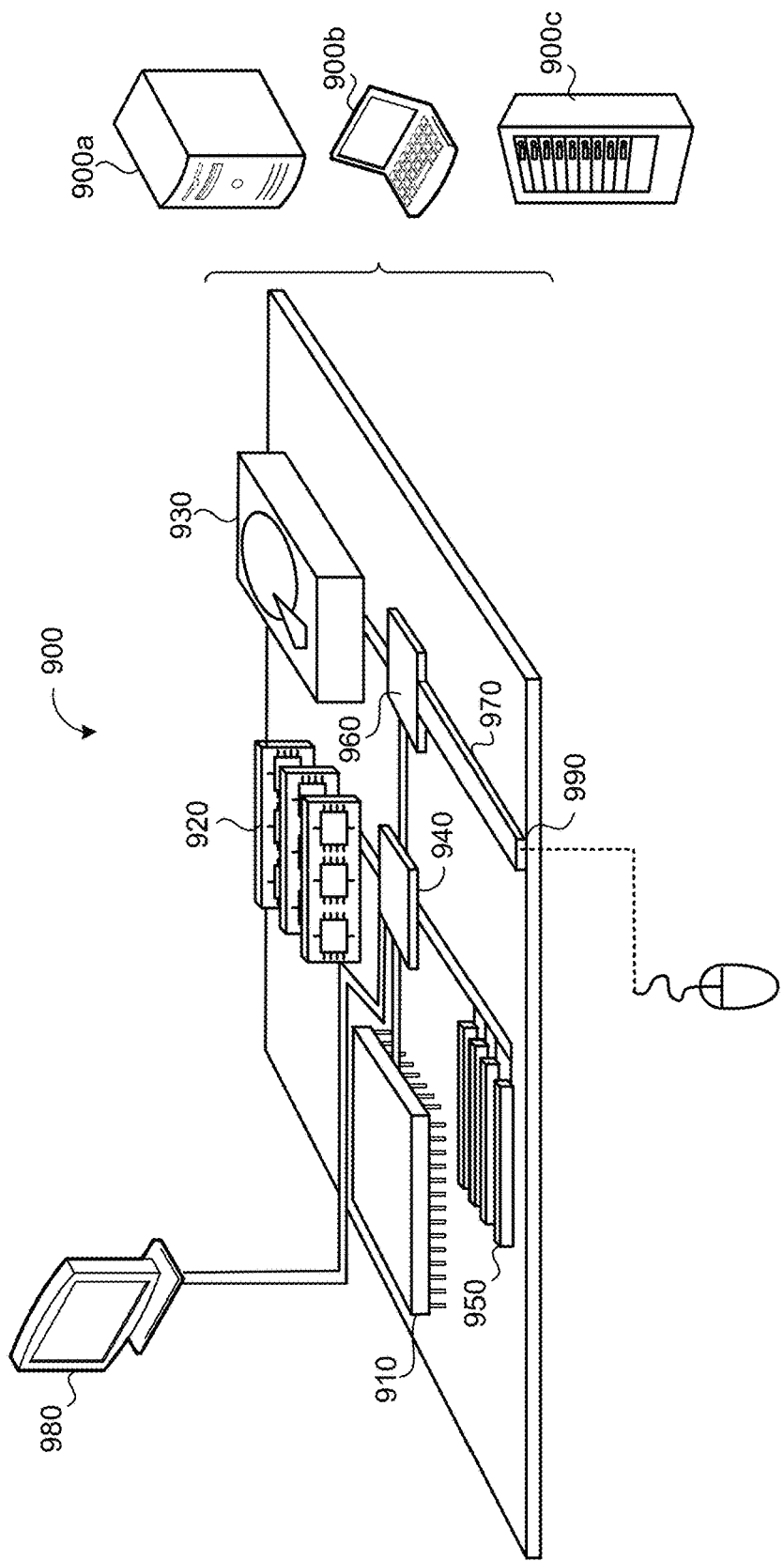
FIG. 9 is a schematic view of an example computing device.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 990, and a low speed interface/controller 960 connecting to a low speed bus 970 and a storage device 930. Each of the components 910, 920, 930, 940, 990, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 990, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900*a* or multiple times in a group of such servers 900*a*, as a laptop computer 900*b*, or as part of a rack server system 900*c*. The computing device 900 (e.g., data processing hardware 105, 604) may be implemented on the UEs 104 and/or the network device 602.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a primary user equipment (UE), a connection request from a network base station on a primary component carrier (CC) associated with the primary UE;
connecting, by the data processing hardware, to the network base station on the primary CC;
receiving, at the data processing hardware, a configuration message from the network base station, the configuration message instructing operation of at least one secondary CC; and
in response to receiving the configuration message:
identifying, by the data processing hardware, at least one secondary UE associated with the at least one secondary CC; and
instructing, by the data processing hardware, the at least one secondary UE to operate on the at least one secondary CC and receive data from the network base station on the at least one secondary CC independently from the primary UE.

2. The method of claim 1, further comprising, in response to receiving the configuration message, instructing, by the data processing hardware, the at least one secondary UE operating on the at least one secondary CC to send the received data from the network base station to a target device.

3. The method of claim 2, wherein the target device comprises at least one of another base station or another UE.

4. The method of claim 1, further comprising:
advertising, by the data processing hardware, a carrier aggregation capability of a combined UE comprising the primary UE and the at least one secondary UE, the combined UE recognized by the network base station as a single UE associated with the primary CC and the at least one secondary CC; and
in response to advertising the carrier aggregation capability, receiving the connection request, the connection request for communicating on one of the primary CC or the at least one secondary CC.

5. The method of claim 1, wherein instructing the at least one secondary CC to operate comprises enabling a combined-UE operating state of the at least one secondary UE, the combined-UE operating state allowing cross-carrier aggregation of a combined UE comprising the primary UE and the at least one secondary UE, the combined UE recognized by the network base station as a single UE associated with the primary CC and the at least one secondary CC.

6. The method of claim 5, wherein the at least one secondary UE comprises a plurality of secondary UEs, and the configuration message instructs enabling a target secondary UE associated with a target secondary CC to receive the data from the network base station.

7. The method of claim 6, further comprising, after enabling the combined-UE operating state of the target secondary UE, scheduling transmission of data from the network base station to the target secondary UE.

8. The method of claim 7, further comprising transmission of the data from the target secondary UE to a target device.

9. The method of claim 5, wherein the at least one secondary CC comprises a plurality of secondary CCs, and the configuration message instructs enabling a target secondary UE to operate on a first target secondary CC to receive the data from the network base station and to operate on a second target secondary CC to receive data from another base station.

10. The method of claim 5, wherein the at least one secondary UE comprises a plurality of secondary UEs and the at least one secondary CC comprises a plurality of secondary CCs, and the configuration message instructs enabling a first target secondary UE associated with a first target secondary CC to receive the data from the base station and instructs enabling a second target secondary UE associated with a second target secondary CC to receive data from the network base station.

11. A system comprising:
a network base station; and
a plurality of user equipment (UE) comprising a primary UE and secondary UEs, each UE associated with at least one component carrier (CC),
wherein the primary UE is configured to perform operations comprising:
receiving a connection request from the network base station on a primary CC associated with the primary UE;
connecting to the network base station on the primary CC;
receiving a configuration message from the network base station, the configuration message instructing operation of at least one secondary CC; and
in response to receiving the configuration message:
identifying at least one secondary UE associated with the at least one secondary CC; and
instructing the at least one secondary UE to operate on the at least one secondary CC and receive data from the network base station on the at least one secondary CC independently from the primary UE.

12. The system of claim 11, wherein the operations further comprise, in response to receiving the configuration message, instructing the at least one secondary UE operating on the at least one secondary CC to send the received data from the network base station to a target device.

13. The system of claim 12, wherein the target device comprises at least one of another base station or another UE.

14. The system of claim 11, wherein the operations further comprise:
advertising a carrier aggregation capability of a combined UE comprising the primary UE and the at least one secondary UE, the combined UE recognized by the network base station as a single UE associated with the primary CC and the at least one secondary CC; and
in response to advertising the carrier aggregation capability, receiving the connection request, the connection request for communicating on one of the primary CC or the at least one secondary CC.

15. The system of claim 11, wherein instructing the at least one secondary CC to operate comprises enabling a combined-UE operating state of the at least one secondary UE, the combined-UE operating state allowing cross-carrier aggregation of a combined UE comprising the primary UE and the at least one secondary UE, the combined UE recognized by the network base station as a single UE associated with the primary CC and the at least one secondary CC.

16. The system of claim 15, wherein the at least one secondary UE comprises a plurality of secondary UEs, and the configuration message instructs enabling a target secondary UE associated with a target secondary CC to receive the data from the network base station.

17. The system of claim 16, wherein the operations further comprise, after enabling the combined-UE operating state of the target secondary UE, scheduling transmission of data from the network base station to the target secondary UE.

18. The system of claim 17, wherein the target secondary UE transmits the data from the network base station to a target device.

19. The system of claim 15, wherein the at least one secondary CC comprises a plurality of secondary CCs, and the configuration message instructs enabling a target secondary UE to operate on a first target secondary CC to receive the data from the base station and to operate on a second target secondary CC to receive data from another base station.

20. The system of claim 15, wherein the at least one secondary UE comprises a plurality of secondary UEs and the at least one secondary CC comprises a plurality of secondary CCs, and the configuration message instructs enabling a first target secondary UE associated with a first target secondary CC to receive the data from the base station and instructs enabling a second target secondary UE associated with a second target secondary CC to receive data from the base station.

21. A method comprising:
   receiving, at data processing hardware of a network device, a communication request from a network base station for delivery of data to a destination, the data processing hardware in communication with a combined user equipment (UE), the combined UE comprising slave UEs, each slave UE in communication with the data processing hardware;
   assigning, by the data processing hardware, each slave UE of the combined UE an associated component carrier (CC) that is different from the CCs associated with the other slave UEs of the combined UE;
   providing, by the data processing hardware, each associated CC assigned to the slave UEs of the combined UE to the network base station; and
   routing, by the data processing hardware, the communication of data from the network base station through the combined UE to the destination, the combined UE recognized by the network base station as a single UE associated with the CCs of the slave UEs, the routing comprising:
      identifying at least one target slave UE for routing the communication of data based on the CC associated with the at least one target slave UE; and
      scheduling the routing of the communication of data through the identified at least one target slave UE.

22. The method of claim 21, wherein the routing further comprises:
   identifying multiple target slave UEs for routing the communication of data; and
   scheduling concurrent routing of the communication of data through the identified multiple target slave UEs.

23. The method of claim 21, wherein each slave UE includes an associated network identity that is different from each other network identity associated with each other slave UE.

24. The method of claim 23, further comprising providing, by the data processing hardware, the network identity associated with each slave UE to the network base station.

25. A system comprising:
   a network base station;
   a combined user equipment (UE) comprising slave UEs, each slave UE having an associated component carrier (CC) that is different from the CCs associated with the other slave UEs, the combined UE recognized by the network base station as a single UE associated with the CCs of the slave UEs;
   a network device in communication with the network base station and the slave UEs, the network base station configured to perform operations comprising:
      receiving a communication request from the network base station for delivery of data to a destination;
      assigning each slave UE of the combined UE an associated component carrier (CC) that is different from the CCs associated with the other slave UEs of the combined UE;
      providing each associated CC assigned to the slave UEs of the combined UE to the network base station; and
      routing the communication of data from the network base station through the combined UE to the destination, the routing comprising:
         identifying at least one target slave UE for routing the communication of data based on the CC associated with the at least one target slave UE; and
         scheduling the routing of the communication of data through the identified at least one target slave UE.

26. The system of claim 25, wherein the routing further comprises:
   identifying multiple target slave UEs for routing the communication of data; and
   scheduling concurrent routing of the communication of data through the identified multiple target slave UEs.

27. The system of claim 25, wherein each slave UE includes an associated network identity that is different from each other network identity associated with each other slave UE.

28. The system of claim 27, further comprising providing the network identity associated with each slave UE to the network base station.

* * * * *